United States Patent
Kobayashi et al.

(10) Patent No.: US 9,176,881 B2
(45) Date of Patent: Nov. 3, 2015

(54) COMPUTER SYSTEM AND STORAGE CONTROL METHOD

(75) Inventors: Masakazu Kobayashi, Yokohama (JP); Hiroshi Nojima, Fujisawa (JP); Takuya Okamoto, Machida (JP)

(73) Assignee: HITACHI, LTD., Tokyo (JP)

( * ) Notice: Subject to any disclaimer, the term of this patent is extended or adjusted under 35 U.S.C. 154(b) by 492 days.

(21) Appl. No.: 13/577,165

(22) PCT Filed: Jan. 26, 2012

(86) PCT No.: PCT/JP2012/051682
§ 371 (c)(1),
(2), (4) Date: Aug. 3, 2012

(87) PCT Pub. No.: WO2013/111305
PCT Pub. Date: Aug. 1, 2013

(65) Prior Publication Data
US 2013/0198457 A1  Aug. 1, 2013

(51) Int. Cl.
*G06F 12/08* (2006.01)
(52) U.S. Cl.
CPC ...... *G06F 12/0866* (2013.01); *G06F 2212/314* (2013.01)
(58) Field of Classification Search
None
See application file for complete search history.

(56) References Cited

U.S. PATENT DOCUMENTS

| | | | |
|---|---|---|---|
| 2002/0004887 A1* | 1/2002 | Kubo | 711/147 |
| 2004/0148486 A1* | 7/2004 | Burton | 711/202 |
| 2005/0120175 A1 | 6/2005 | Shimada et al. | |
| 2006/0020754 A1 | 1/2006 | Suzuki et al. | |
| 2009/0043959 A1* | 2/2009 | Yamamoto | 711/112 |
| 2010/0100604 A1 | 4/2010 | Fujiwara et al. | |
| 2010/0218039 A1* | 8/2010 | Brown et al. | 714/6 |

FOREIGN PATENT DOCUMENTS

| | | |
|---|---|---|
| JP | 2003-131818 A | 5/2003 |
| JP | 2005-157882 A | 6/2005 |
| JP | 2007-265441 A | 10/2007 |
| JP | 2010-097526 A | 4/2010 |

* cited by examiner

*Primary Examiner* — Denise Tran
(74) *Attorney, Agent, or Firm* — Volpe and Koenig, P.C.

(57) ABSTRACT

The entirety or a part of free space of a second storage device included in a host computer is used as a cache memory region (external cache) outside of a storage apparatus. If Input/Output (I/O) in the host computer is Write, a Write request is transmitted from the host computer to a storage apparatus, the storage apparatus writes data associated with the Write request into a main cache that is a cache memory region included in this storage apparatus, and the storage apparatus writes the data in the main cache into a first storage device included in the storage apparatus. The storage apparatus writes the data in the main cache into an external cache included in the host computer. If the I/O in the host computer is Read, the host computer determines whether or not Read data as target data of the Read exists in the external cache. If a result of the determination is positive, the host computer reads the Read data from the external cache.

13 Claims, 28 Drawing Sheets

Fig. 5

| DATA IDENTIFIER 131a | STORAGE IDENTIFIER 131b | COUPLING IDENTIFIER 131c | DISK IDENTIFIER 131d | CACHE SIZE 131e | DATA ADDRESS 131f | CACHE ADDRESS 131g | LAST ACCESS DATE AND TIME 131h |
|---|---|---|---|---|---|---|---|
| 1 | VSP#01 | 00 | 00:20:03 | 84MB | 0x000120 | 0x000204 | 2011/11/01 19:30:00 |
| 2 | DF800#01 | 00 | 5D | 84MB | 0x100540 | 0x100624 | 2011/11/01 20:00:00 |
| 3 | VSP#01 | 01 | 00:20:04 | 126MB | 0x400780 | 0x400906 | 2011/11/01 20:30:00 |
| 4 | VSP#01 | 02 | 00:20:05 | 126MB | 0x020010 | 0x020136 | 2011/11/02 14:30:00 |
| 5 | USP_V#02 | 00 | 10:02:1A | 42MB | 0x200350 | 0x200392 | 2011/11/02 15:30:00 |
| 6 | USP#03 | 03 | 3B:02:00 | 42MB | 0x700730 | 0x700772 | 2011/11/03 10:00:00 |
| 7 | DF800#05 | 00 | 1D | 84MB | 0x600340 | 0x600424 | 2011/11/03 11:30:00 |
| 8 | DF800#05 | 01 | 1E | 84MB | 0x300980 | 0x301064 | 2011/11/03 12:30:00 |

Fig. 6

| DATA IDENTIFIER | OPERATION HOST IDENTIFIER | OPERATION HOST COUPLING IDENTIFIER | DISK IDENTIFIER | CACHE SIZE | DATA ADDRESS | CACHE ADDRESS | LAST ACCESS DATE AND TIME |
|---|---|---|---|---|---|---|---|
| 1 | HOST_01 | X00 | 00:20:03 | 84MB | 0x000120 | 0x000204 | 2011/11/01 19:30:00 |
| 2 | HOST_02 | X01 | 1E:00:1A | 84MB | 0x030450 | 0x030534 | 2011/11/01 20:00:00 |
| 3 | HOST_01 | X02 | 00:20:04 | 126MB | 0x400780 | 0x400906 | 2011/11/01 20:30:00 |
| 4 | HOST_01 | X03 | 00:20:05 | 126MB | 0x020010 | 0x020136 | 2011/11/02 14:30:00 |
| 5 | HOST_03 | X04 | 00:5E:01 | 42MB | 0x300340 | 0x300382 | 2011/11/02 15:30:00 |
| 6 | HOST_04 | X05 | 2E:0B:00 | 42MB | 0x600670 | 0x600712 | 2011/11/03 10:00:00 |
| 7 | HOST_02 | X06 | 1E:00:1B | 84MB | 0x070900 | 0x070984 | 2011/11/03 11:30:00 |
| 8 | HOST_02 | X07 | 1E:00:1C | 84MB | 0x800230 | 0x800314 | 2011/11/03 12:30:00 |

Fig. 7

| DATA IDENTIFIER 242a | DISK IDENTIFIER 242b | ACCESS-SOURCE OPERATION HOST IDENTIFIER 242c | ACCESS DATE AND TIME 242d |
|---|---|---|---|
| 1 | 00:20:03 | HOST_01 | 2011/11/01 10:00:00 |
| 1 | 00:20:03 | HOST_02 | 2011/11/01 10:01:00 |
| 1 | 00:20:03 | HOST_01 | 2011/11/01 10:02:00 |
| 2 | 1E:00:1A | HOST_02 | 2011/11/01 10:03:00 |
| 2 | 1E:00:1A | HOST_02 | 2011/11/01 10:04:00 |
| 3 | 00:20:04 | HOST_01 | 2011/11/01 10:05:00 |
| 3 | 00:20:04 | HOST_01 | 2011/11/01 10:06:00 |
| ... | ... | ... | ... |

Fig. 8

| OPERATION HOST IDENTIFIER 311a | INTENDED USE 311b | CACHE USE AVAILABILITY 311c | USABLE PERIOD OF TIME 311d | ENTIRE DRIVE FREE SPACE (GB) 311e | CACHE USE SIZE (GB) 311f | DATA REFERENCE ACCESS PERMISSION I/O THRESHOLD (Mb/Sec) 311g | DATA WRITE PERMISSION THROUGHPUT THRESHOLD (Mb/Sec) 311h | ACCESS INFORMATION 311i |
|---|---|---|---|---|---|---|---|---|
| HOST_01 | DATA CALCULATION | POSSIBLE | 2011/11/01 ~ 2011/11/10 | 30 | 8 | 80 | 50 | UserID/Pass |
| HOST_02 | BATCH PROCESS | POSSIBLE | 05:00:00 ~ 20:00:00 | 55 | 12 | 50 | 60 | UserID/Pass |
| HOST_03 | DATABASE | IMPOSSIBLE | - | 70 | 0 | 50 | 45 | UserID/Pass |
| HOST_04 | Web SERVER | POSSIBLE | MON/WED/FRI | 80 | 30 | 30 | 25 | UserID/Pass |
| ... | ... | ... | ... | ... | ... | ... | ... | ... |

| OPERATION HOST IDENTIFIER 312a | MEASUREMENT TIME 312b | Read AVERAGE I/O (Mb/Sec) 312c | Write AVERAGE I/O (Mb/Sec) 312d | NETWORK RECEPTION AVERAGE THROUGHPUT (Mb/Sec) 312e | NETWORK TRANSMISSION AVERAGE THROUGHPUT (Mb/Sec) 312f | CACHE USE SIZE (GB) 312g |
|---|---|---|---|---|---|---|
| HOST_01 | 00:00 ~ 01:00 | 92.02 | 88.82 | 34.02 | 23.82 | 10 |
| HOST_01 | ... | ... | ... | ... | ... | 5 |
| HOST_01 | 12:00 ~ 13:00 | 75.54 | 102.85 | 83.54 | 78.85 | 2 |
| HOST_01 | ... | ... | ... | ... | ... | 7 |
| HOST_01 | 23:00 ~ 24:00 | 79.35 | 89.55 | 39.35 | 23.55 | 10 |
| ... | ... | ... | ... | ... | ... | ... |

| DATA IDEN-TIFIER | STORAGE IDENTIFIER 131b | COUPLING IDENTIFIER 131c | DISK COUPLING IDENTIFIER 131d | CACHE SIZE 131e | DATA ADDRESS 131f | CACHE ADDRESS 131g | LAST ACCESS DATE AND TIME 131h | STORAGE-DESTINATION OPERATION HOST IDENTIFIER 131i | OPERATION HOST COUPLING IDENTIFIER 131j |
|---|---|---|---|---|---|---|---|---|---|
| 1 | VSP#01 | 00 | 00:20:03 | 84MB | 0x000120 | 0x000204 | 2011/11/01 19:30:00 | HOST_01 | - |
| 2 | DF800#01 | 00 | 5D | 84MB | 0x100540 | 0x100624 | 2011/11/01 20:00:00 | HOST_03 | X01 |
| 3 | VSP#01 | 01 | 00:20:04 | 126MB | 0x400780 | 0x400906 | 2011/11/01 20:30:00 | HOST_01 | - |
| 4 | VSP#01 | 02 | 00:20:05 | 126MB | 0x020010 | 0x020136 | 2011/11/02 14:30:00 | HOST_01 | - |
| 5 | USP_V#02 | 00 | 10:02:1A | 42MB | 0x200350 | 0x200392 | 2011/11/02 15:30:00 | HOST_02 | X02 |
| 6 | USP#03 | 03 | 3B:02:00 | 42MB | 0x700730 | 0x700772 | 2011/11/03 10:00:00 | HOST_02 | X03 |
| 7 | DF800#05 | 00 | 1D | 84MB | 0x600340 | 0x600424 | 2011/11/03 11:30:00 | HOST_03 | X04 |
| 8 | DF800#05 | 01 | 1E | 84MB | 0x300980 | 0x301064 | 2011/11/03 12:30:00 | HOST_02 | X05 |

COMPUTER SYSTEM AND STORAGE CONTROL METHOD

TECHNICAL FIELD

The present invention relates to a technique for managing data used by a host computer.

BACKGROUND ART

The prices of high-speed storage devices are becoming lower, and a large-capacity memory or a solid state disk (SSD) may be adopted in some cases for a host computer (hereinafter, operation host) that carries out operations (for example, database management).

Further, a known technique for storage systems involves temporarily caching data in a storage device having a high access rate to thereby speed up a response to a host computer. A known technique concerning a cache involves, for example, directly using, in a clustered storage, an update value and a value before the update of data held in a cache memory of each cluster through a network that couples the clusters to one another, to thereby avoid a decrease in use efficiency of the cache memories (see Patent Literature 1).

Another known technique involves ensuring data consistency of a plurality of storage volumes when a plurality of replicas are created for storage volume data in a storage apparatus (see Patent Literature 2).

CITATION LIST

Patent Literature

[Patent Literature 1]
  Japanese Patent Laid-Open No. 2003-131818
[Patent Literature 2]
  Japanese Patent Laid-Open No. 2007-265441

SUMMARY OF INVENTION

Technical Problem

As described above, a host computer includes a storage device (particularly, a high-speed storage device such as an SSD), and free space as a surplus resource exists in the storage device. Unfortunately, this free space is not effectively utilized.

Solution to Problem

The entirety or a part of free space of a second storage device included in a host computer is used as a cache memory region (external cache) outside of a storage apparatus. If Input/Output (I/O) in the host computer is Write, a Write request is transmitted from the host computer to a storage apparatus, the storage apparatus writes data associated with the Write request (hereinafter, Write data) into a cache memory region included in this storage apparatus (hereinafter, main cache), and the storage apparatus writes the Write data in the main cache into a first storage device included in the storage apparatus. Further, the storage apparatus writes data (for example, the Write data) in the main cache into an external cache included in the host computer. If the I/O in the host computer is Read, the host computer determines whether or not Read data as target data of the Read exists in the external cache. If a result of the determination is positive, the host computer reads the Read data from the external cache.

BRIEF DESCRIPTION OF DRAWINGS

FIG. 5 is a configuration diagram of an external cache management table according to Example 1.
FIG. 6 is a configuration diagram of an external cache allocation table according to Example 1.
FIG. 7 is a configuration diagram of an external cache reference frequency table according to Example 1.
FIG. 8 is a configuration diagram of an operation host table according to Example 1.
FIG. 9 is a configuration diagram of an operation host working state table according to Example 1.
FIG. 23 is a configuration diagram of an external cache management table according to Example 2.

DESCRIPTION OF EMBODIMENTS

Figure 1:
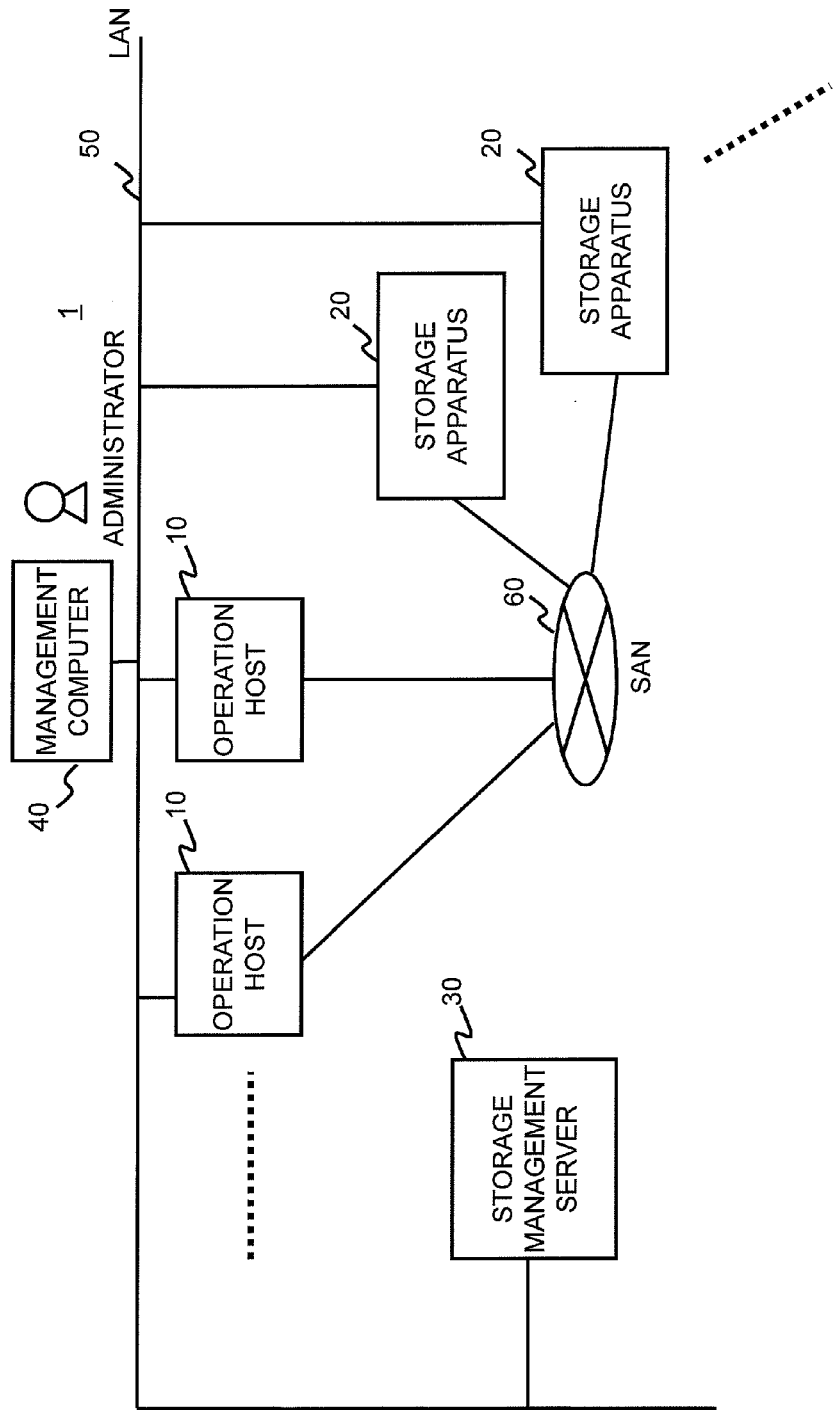
FIG. 1 is an overall configuration diagram of a computer system according to Example 1.

Some examples are described with reference to the drawings. Note that the examples described below do not limit the invention according to Claims, and all elements described in the examples and all the combinations thereof are not necessarily essential to solutions of the invention.

Note that, in the following description, the expression of "aaa table" may be used in some cases to describe various pieces of information, and the various pieces of information may be expressed by a data structure other than a table. In order to show independence from a data structure, an "aaa table" can be called "aaa information".

Further, in the following description, the expressions of "identifying information", "identifier", "code", "name", and "ID" are used to describe the contents of each piece of information, and these expressions can be replaced with one another.

Further, in the following description, a "program" or a "module" may be used in some cases as a subject of a sentence, and the program and the module are implemented by a control device to thereby perform a given process with the use of a storage resource (for example, a memory) and a communication interface device (for example, a communication port). Hence, the control device may be used as the subject of such a sentence. The control device includes a processor (typically, a microprocessor such as a central processing unit (CPU)), and may further include a special hardware circuit that performs a predetermined process (for example, at least one of a circuit for encoding, a circuit for decoding, a circuit for compression, and a circuit for decompression). A process that is disclosed with a program being used as the subject may be regarded as a process that is performed by a control device or an apparatus (for example, an operation host, a storage apparatus, or a storage management server to be described later) including the control device. Further, a part or the entirety of a program may be implemented by a special hardware circuit. Further, various programs may be installed in each computer by means of a program distribution server or a computer-readable storage medium.

Further, the storage management server may include an input/output device. Conceivable examples of the input/output device include a display, a keyboard, and a pointer device, but may be other devices.

Further, a management system in a computer system may be a group of one or more computers. In the case where a computer displays information for display, the computer may be the management system. Further, the combination of a computer and an apparatus for display may be the management system. Further, a process equivalent to that of the management system may be achieved by a plurality of computers in order to speed up a managing process and increase the reliability thereof. In this case, the plurality of computers (if an apparatus for display performs display, the computers include the apparatus for display) may be the management system.

Further, an action of "displaying" by a control device (and a computer including the control device) may be any of: an action of displaying, by the control device, screen components and the like on a display device of the computer including the control device; and an action of transmitting, by the control device, information for display indicating screen components and the like to a second computer including a display device, the screen components and the like being to be displayed on the display device. When receiving the information for display, the second computer can display, on the display device, the screen components and the like indicated by the information for display.

Example 1

FIG. 1 is an overall configuration diagram of a computer system according to Example 1.

A computer system 1 includes one or more host computers for operations (operation hosts) 10, one or more storage apparatuses 20, a storage management server 30, and a management computer 40. The storage management server 30 and the management computer 40 are components of a management system. The management computer 40 may be a computer as an input/output console, and the storage management server 30 may be a computer as a control console.

The operation host 10 and the storage apparatus 20 are communicably coupled to each other through, for example, a first communication network (for example, a storage area network (SAN) 60). Further, the operation host 10, the storage apparatus 20, the storage management server 30, and the management computer 40 are coupled to one another through, for example, a second communication network (for example, a local area network (LAN) 50). The first and second communication networks may be integrated.

The operation host 10 carries out various processes concerning operations, reads data from the storage apparatus 20, and writes data into the storage apparatus 20. The storage apparatus 20 stores data used by the operation host 10. The storage management server 30 comprises, for example, a computer, stores information for managing the storage apparatus 20 and the operation host 10, and carries out various processes for managing the storage apparatus 20 and the operation host 10. The management computer 40 comprises, for example, a PC, displays various screens based on information managed by the storage management server 30, and receives various configurations from an administrator to report the received configurations to the storage management server 30.

Figure 26:
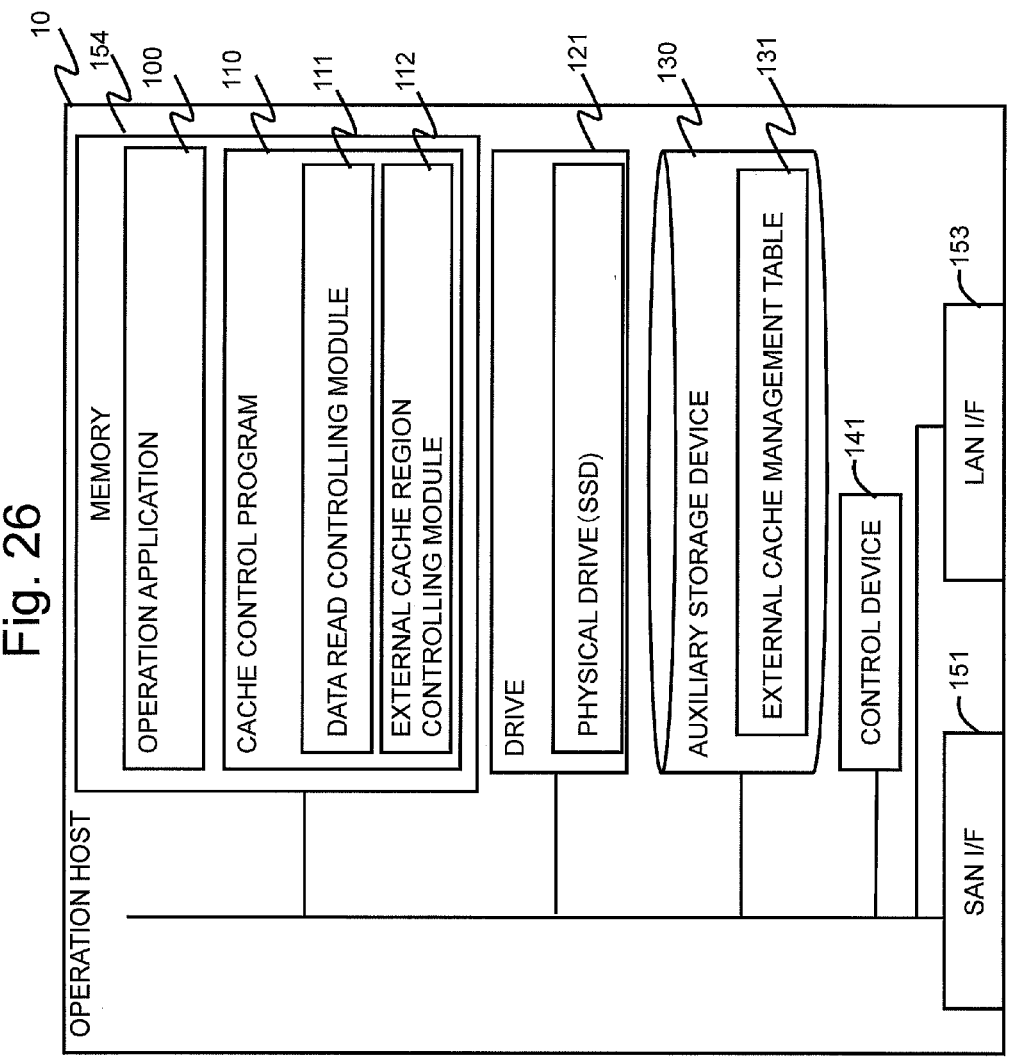
FIG. 26 illustrates a configuration example of the operation host according to Example 1.

As illustrated in FIG. 26, the operation host 10 includes communication interface devices (I/Fs), storage resources, and a control device (hereinafter, host control device) 141 coupled to these components. Examples of the I/Fs include: a SAN I/F 151 (for example, a host bus adapter (HBA)) that makes communications through the SAN 60; and a LAN I/F 153 (for example, a LAN controller) that makes communications through the LAN 50. Examples of the storage resources include a memory 154, a drive 121, and an auxiliary storage device 130. The memory 120 stores an operation application 100 and a cache control program 110. The operation application 100 is implemented by a processor included in the host control device 141, to thereby carry out various processes for operations. The cache control program 110 includes a data read controlling module 111 and an external cache region controlling module 112, and is implemented by the processor included in the host control device 141. The drive 121 is, for example, a storage device capable of faster reading/writing than that of the auxiliary storage device 130, and is, for example, an SSD. The auxiliary storage device 130 is, for example, an HDD. The auxiliary storage device 130 stores an external cache management table 131.

Figure 27:
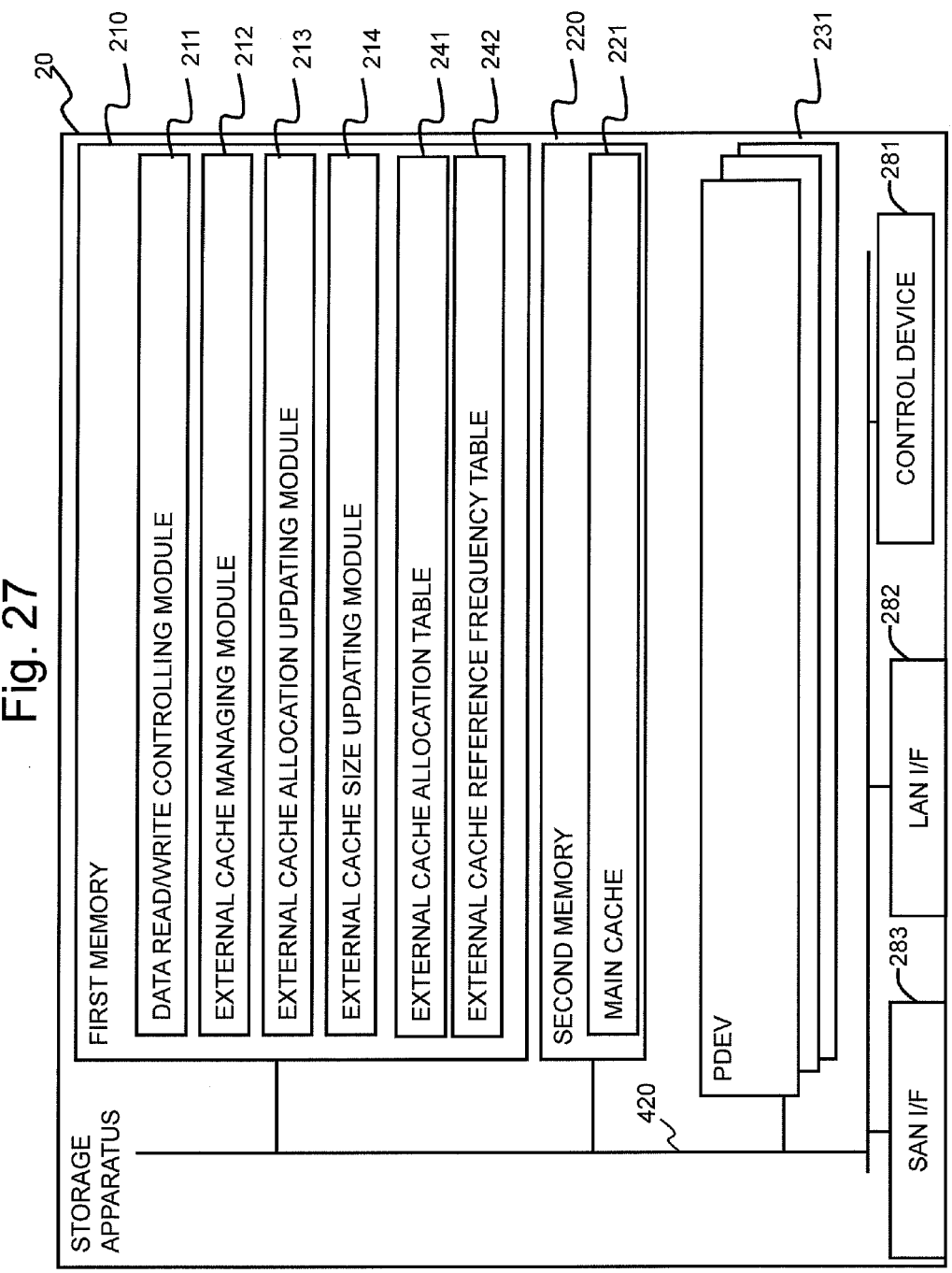
FIG. 27 illustrates a configuration example of the storage apparatus according to Example 1.

As illustrated in FIG. 27, the storage apparatus 20 includes communication interface devices (I/Fs), one or more non-volatile physical storage devices (hereinafter, PDEVs) 231, storage resources, and a control device (hereinafter, storage control device) 281 that is coupled to these components through an internal network 420. The internal network 420 may be, for example, a switch or bus (not illustrated). Examples of the I/Fs include: a SAN I/F 283 (for example, an interface board including one or more communication ports); and a LAN I/F 282 (for example, a LAN controller). The PDEV 231 is, for example, an SAS-HDD (SAS: serial attached SCSI). The PDEV 231 may be another type of HDD instead of the SAS-HDD, and may be a storage device (for example, an SSD) other than an HDD. A plurality of PDEVs may form a RAID group. One or more PDEVs may form a logical storage device (hereinafter, LDEV), and the LDEV may be mounted as a volume on the operation host 10. Examples of the storage resources include a first memory 210, a second memory 220, and an auxiliary storage device (for example, an HDD) 240. The first memory 210 stores a data read/write controlling module 211, an external cache managing module 212, an external cache allocation updating module 213, an external cache size updating module 214, an external cache allocation table 241, and an external cache reference frequency table 242. These modules 211 through 214 are implemented by a processor included in the storage control device 281. The second memory 220 is, for example, a volatile (or non-volatile) memory, and at least part of the second memory 220 is used as a cache memory region (hereinafter, main cache) 221.

Figure 28:
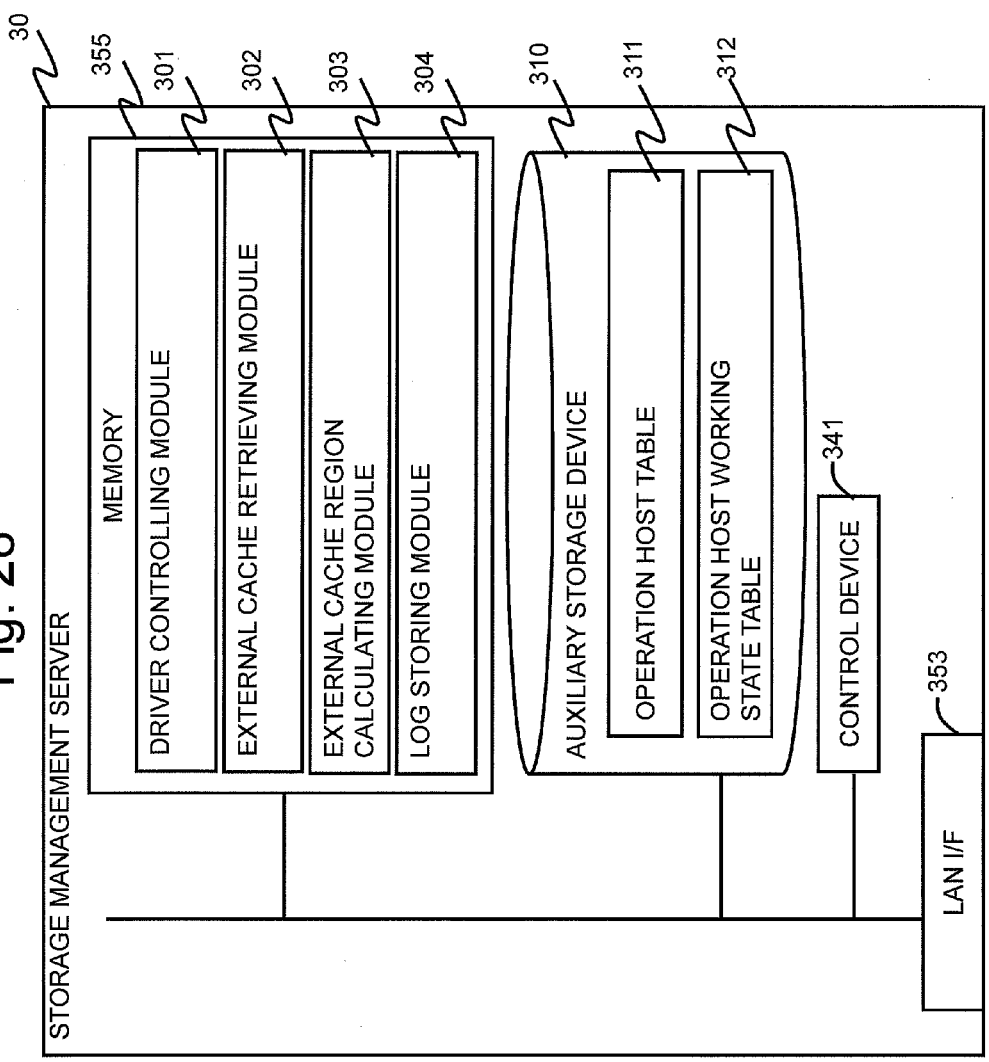
FIG. 28 illustrates a configuration example of a storage management server according to Example 1.

As illustrated in FIG. 28, the storage management server 30 includes a communication interface device (I/F), storage resources, and a control device (hereinafter, server control device) 341 coupled to these components. Examples of the I/F include a LAN I/F 353. Examples of the storage resources include a memory 355 and an auxiliary storage device (for example, an HDD) 310. The memory 355 stores, for example, a driver controlling module 301, an external cache retrieving module 302, an external cache region calculating module 303, and a log storing module 304. These modules 301 through 304 are implemented by a processor included in the server control device 341. The auxiliary storage device 310 stores an operation host table 311 and an operation host working state table 312.

Hereinafter, with reference to FIG. 2 through FIG. 4, the outlines of a data writing process, a data reading process, and a process of moving data from the main cache are described. Note that, in FIG. 2 through FIG. 4, the number of operation hosts 10 is assumed to be two, that is, operation hosts #1 and #2.

Figure 2:
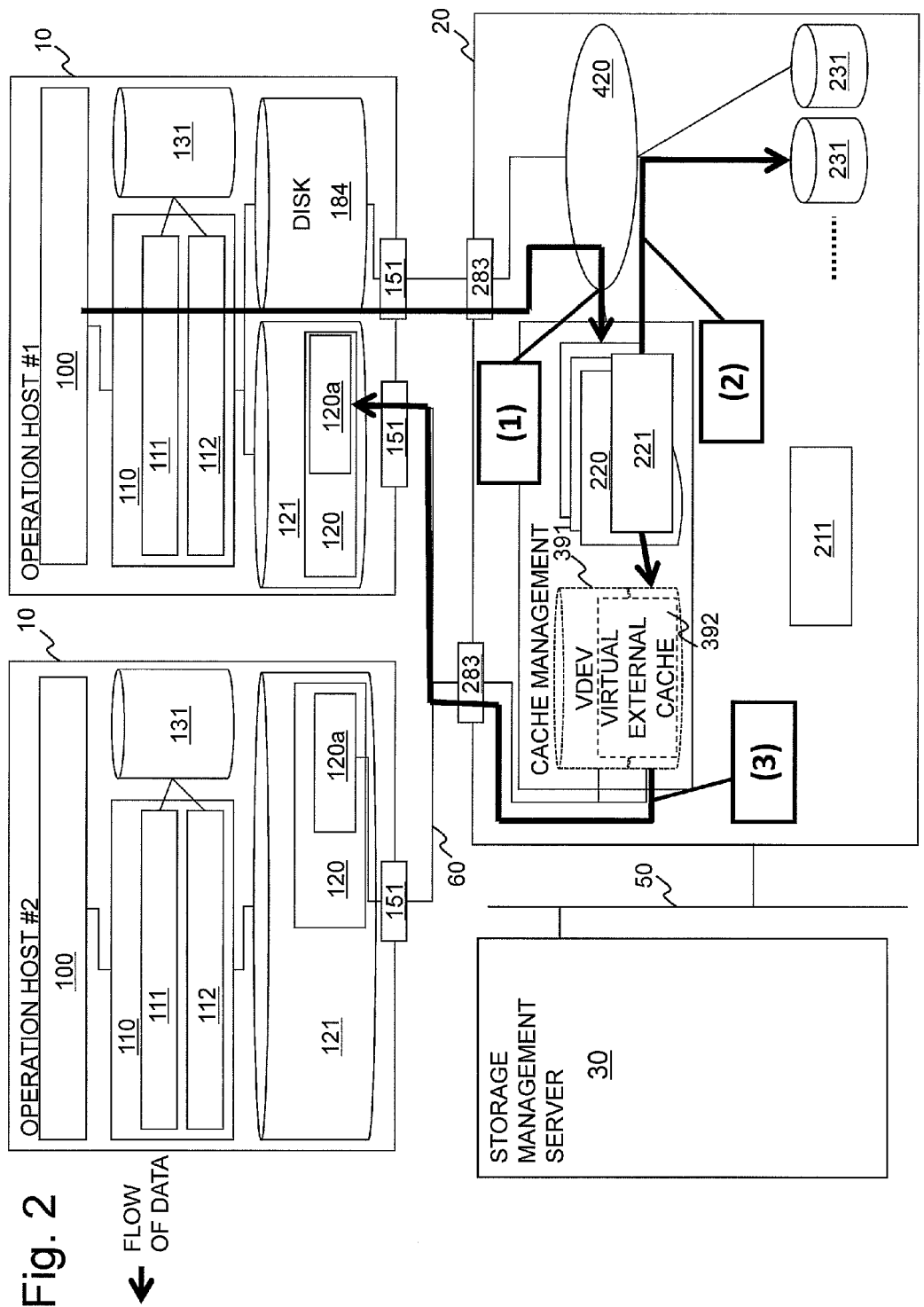
FIG. 2 is a diagram illustrating the outline of a writing process according to Example 1.

FIG. 2 is a diagram illustrating the outline of the writing process according to Example 1. Note that, in FIG. 2 through FIG. 4, the disk 184 is illustrated only in the operation host #1, but the disk 184 also exists in another operation host. Further, two or more disks 184 may exist in one operation host.

The storage apparatus 20 includes a VDEV 391. The VDEV 391 is a virtual LDEV. The VDEV 391 includes one or more virtual regions. The virtual region is a virtual external cache 392 of the main cache 221. The entirety or a part (hereinafter, actual external cache) 120a of a free space 120 of the drive 121 in the operation host 10 is mapped to the virtual external cache 392. For example, a storage virtualization technique is applied to this mapping. Accordingly, data written into the virtual external cache 392 is actually written into the actual external cache 120a mapped to the virtual external cache 392, and data read from the virtual external cache 392 is actually read from the actual external cache 120a mapped to the virtual external cache 392. That is, the actual external cache 120a is a cache memory region outside of the storage apparatus 20.

In the operation host #1, in the case where data writing into the disk 184 occurs by means of the operation application 100, a data Write request is transmitted from the operation host 10 to the storage apparatus 20. In the storage apparatus 20, the SAN I/F 283 receives the Write request, and the data read/write controlling module 211 writes writing target data (Write data) associated with the received Write request, into the main cache 221 ((1) in FIG. 2). After writing the Write data into the main cache 221, the data read/write controlling module 211 may return a response to the Write request to the operation host #1.

After that, the read/write controlling module 211 writes the Write data from the main cache 221 into the PDEV 231 (the PDEV 231 that is the basis for an LDEV (a writing-destination LDEV designated by the Write request) corresponding to the disk 184) ((2) in FIG. 2).

Further, the external cache managing module 212 writes the Write data in the main cache 221, into the virtual external cache 392, to thereby write the Write data into the actual external cache 120a of the operation host #1, the actual external cache 120a being mapped to this virtual external cache 329 ((3) in FIG. 2). Note that the actual external cache 120a as a writing destination of the Write data may be the actual external cache 120a of the another operation host #2 instead of the actual external cache 120a of the operation host #1 as a transmission source of the Write data.

Note that the disk 184 is storage space corresponding to the LDEV mounted on the storage apparatus 20. In Example 1, the expression of "disk" is adopted for the sake of convenience, but the disk 184 may correspond to an LDEV based on PDEVs other than the disk-shaped PDEVs.

Figure 3:
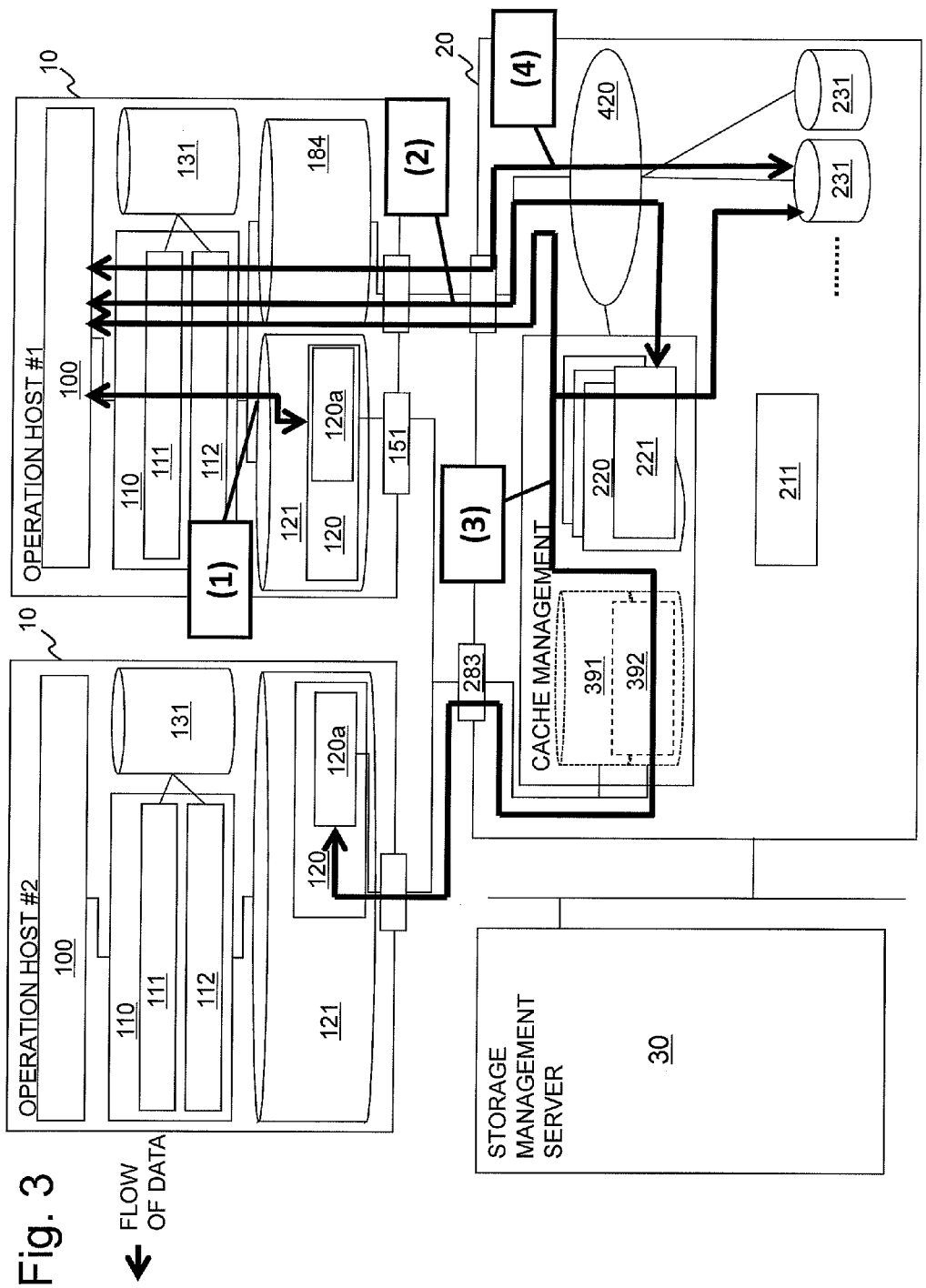
FIG. 3 is a diagram illustrating the outline of a reading process according to Example 1.

FIG. 3 is a diagram illustrating the outline of the reading process according to Example 1.

In the operation host #1, in the case where data reading from the disk 184 occurs by means of the operation application 100, reading target data (Read data) is read according to any of the following four reading patterns depending on storage conditions of the Read data.

(First Reading Pattern)

The data read controlling module 111 determines whether or not the Read data is cached in the actual external cache 120a of the operation host #1 including the operation application 100 that requests the reading. If it is determined that the Read data is cached in the actual external cache 120a of the operation host #1, the data read controlling module 111 reads the Read data from this actual external cache 120a ((1) in FIG. 3). In this case, a Read request does not need to be issued to the storage apparatus 20, that is, the access to the storage apparatus 20 is not necessary. The operation application 100 can acquire data read by the data read controlling module 111.

(Second Reading Pattern)

If it is determined that the Read data is not cached in the actual external cache 120a of the operation host #1, the data read controlling module 111 transmits a Read request (a Read request in which an LDEV corresponding to the disk 184 is specified) of the Read data, to the storage apparatus 20. In the storage apparatus 20, the SAN I/F 283 receives the Read request, and the data read/write controlling module 211 determines whether or not the Read data associated with the Read request is cached in the main cache 221. If the Read data is cached in the main cache 221, the data read/write controlling module 211 reads the Read data from the main cache 221, and transmits the Read data as a response to the Read request, to the operation host #1 ((2) in FIG. 3).

(Third Reading Pattern)

If it is determined that the Read data is not cached in the main cache 221 but cached in the actual external cache 120a of the another operation host #2, the data read/write controlling module 211 reads the Read data from the actual external cache 120a of the operation host #2, and transmits the Read data as a response to the Read request, to the operation host #1 ((3) in FIG. 3). The time required in the reading process according to the third reading pattern may be shorter than the time required in the reading process according to a fourth reading pattern described below. Note that, in (3) in FIG. 3, the data read/write controlling module 211 can read the Read data from the PDEV 231 (the PDEV 231 that is the basis for an LDEV (a reading-source LDEV specified by the Read request) corresponding to the disk 184), in parallel with (for example, at the same time as) reading the Read data from the actual external cache 120*a* of the operation host #2. The data read/write controlling module 211 can transmit Read data as a response to the Read request, to the operation host #1, the Read data being data that can be acquired earlier between the actual external cache 120*a* of the operation host #2 and the PDEV 231.

(Fourth Reading Pattern)

If it is determined that the Read data is not cached in the main cache 221 and the actual external cache 120*a* of the another operation host #2, the data read/write controlling module 211 reads the Read data from the PDEV 231 (the PDEV 231 that is the basis for an LDEV (a reading-source LDEV specified by the Read request) corresponding to the disk 184), stores the Read data into the main cache 221, and transmits the Read data as a response to the Read request, to the operation host #1 ((4) in FIG. 3).

Figure 4:
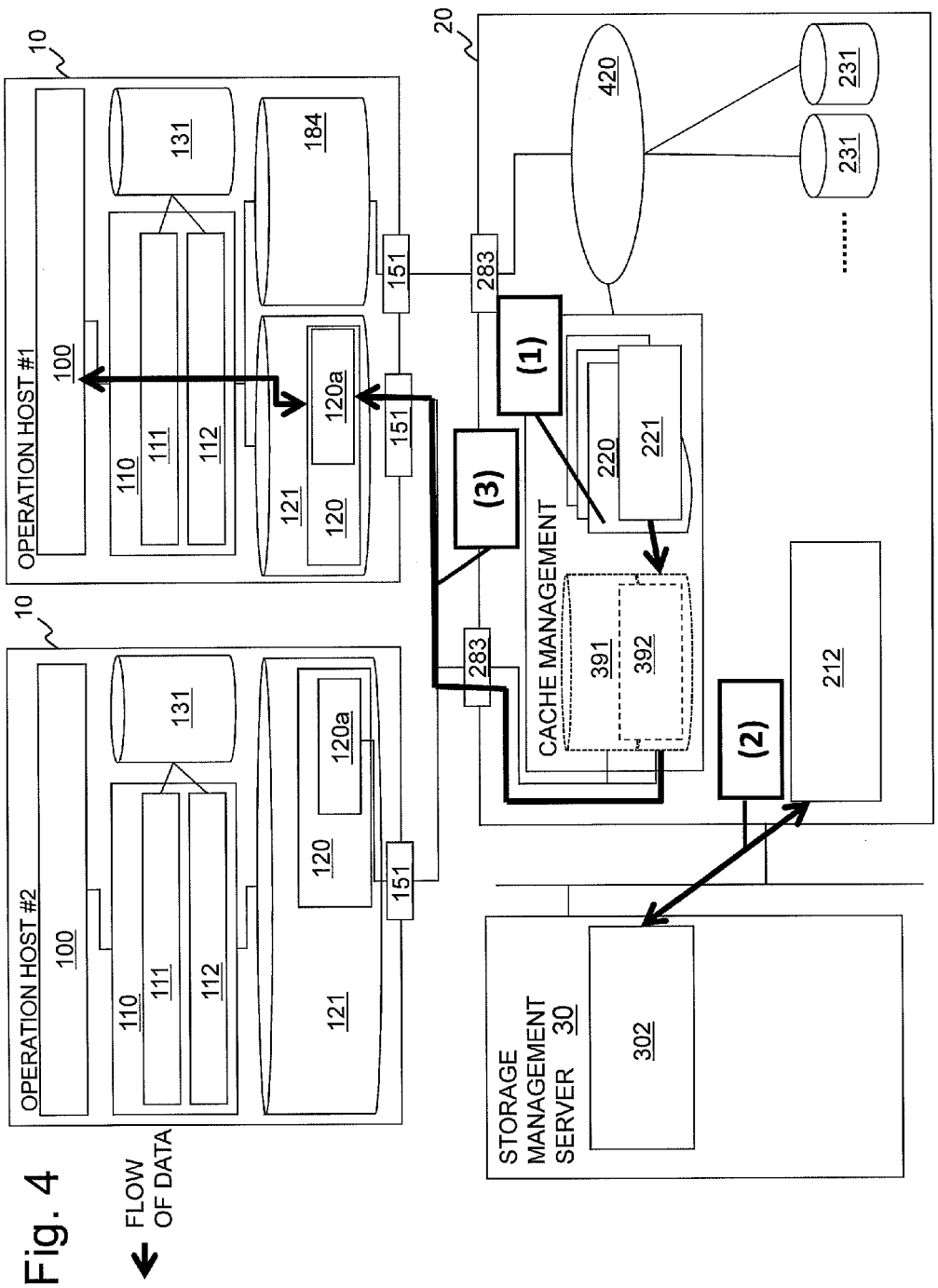
FIG. 4 is a diagram illustrating the outline of a moving process according to Example 1.

FIG. 4 is a diagram illustrating the outline of the moving process according to Example 1.

In the storage apparatus 20, the external cache managing module 212 detects overwriting or deletion of data (hereinafter, "target data" in the description of FIG. 4) in the main cache 221 ((1) in FIG. 4). The external cache managing module 212 requests the external cache retrieving module 302 of the storage management server 30 to retrieve the operation host 10 as a moving destination (cache destination) of the target data, and receives which operation host 10 is to be the cache destination, from the external cache retrieving module 302 ((2) in FIG. 4). The external cache managing module 212 stores the target data into the external cache 120*a* of the specified operation host 10 ((3) in FIG. 4).

Next, configurations of the tables according to Example 1 are described.

FIG. 5 is a configuration diagram of the external cache management table 131.

The external cache management table 131 exists in the operation host 10. The external cache management table 131 includes a data identifier 131*a*, a storage identifier 131*b*, a coupling identifier 131*c*, a disk identifier 131*d*, a cache size 131*e*, a data address 131*f*, a cache address 131*g*, and a last access date and time 131*h* for each data ("cache data" in the description of FIG. 5 to FIG. 7) stored in the external cache 120*a*. These pieces of information 131*a* to 131*h* are as follows.

The data identifier 131*a* is an identifier indicating the cache data.

The storage identifier 131*b* is an identifier of the storage apparatus 20 including an LDEV that stores data (for the sake of convenience, referred to as "original data" in FIG. 5 to FIG. 7) coincident with the cache data.

The coupling identifier 131*c* is a coupling identifier that is used by the operation host 10 to couple to a PDEV that stores the original data of the cache data. For example, a logical unit number (LUN) can be used as the coupling identifier.

The disk identifier 131*d* is an identifier of the disk (the disk in the operation host 10 including the table 131 of FIG. 5) 184 that can be a reading source of the original data of the cache data.

The cache size 131*e* represents the size of the cache data. This size may be equal to, for example, the size of X (X is an integer equal to or larger than one) pages (unit storage region). That is, the cache data may be a multiple of the size of pages (the size of one page is, for example, 42 MB). The size of the cache data may be a size that does not depend on the size of pages.

The data address 131*f* is an address (for example, a logical block address (LBA)) of a region in which the original data of the cache data is stored. Note that an address as the data address 131*f* belongs to the disk 184 of the operation host 10.

The cache address 131*g* is an address of a region (a region in the actual external cache 120*a*) in which the cache data is stored.

The last access date and time 131*h* represents a date and time at which the cache data is last accessed. Note that the date and time is expressed by year, month, day, hour, minute, and second, but at least one of these units may be omitted.

The following is understood according to the topmost record in the external cache management table 131.

The original data of the cache data "1" can be read from the address "0x000120" of the disk "00:20:03" corresponding to the LDEV "00" of the storage apparatus "VSP#01".

The size of the cache data "1" is "84 MB".

The cache data "1" can be read from the address "0x000204" of the actual external cache 120*a* of the operation host 10 including the table 131 of FIG. 5, and the date and time at which the cache data "1" existing at the address "0x000204" is last accessed is "2011/11/01 19:30:00".

FIG. 6 is a configuration diagram of the external cache allocation table 241.

The external cache allocation table 241 exists in the storage apparatus 20. The external cache allocation table 241 includes a data identifier 241*a*, an operation host identifier 241*b*, an operation host coupling identifier 241*c*, a disk identifier 241*d*, a cache size 241*e*, a data address 241*f*, a cache address 241*g*, and a last access date and time 241*h* for each cache data. These pieces of information are as follows.

The data identifier 241*a* is an identifier of the cache data.

The operation host identifier 241*b* is an identifier of the operation host 10 including the actual external cache 120*a* mapped to the virtual external cache 392 that stores the cache data.

The operation host coupling identifier 241*c* is an identifier that is used to couple to the actual external cache 120*a* mapped to the virtual external cache 392 that stores the cache data.

The LDEV identifier 241*d* is an identifier of an LDEV that can be a reading source of the original data of the cache data.

The cache size 241*e* is the size of the cache data.

The data address 241*f* is an address of a region (a region in an LDEV) in which the original data of the cache data is stored.

The cache address 241*g* is an address of a region (a region in the virtual external cache 392) in which the cache data is stored.

The last access date and time 241*h* represents a date and time at which the cache data is last accessed.

The following is understood according to the topmost record in the external cache allocation table 241.

The cache data "1" exists in the external cache 120*a* in the operation host "HOST_01".

This external cache 120*a* can be accessed using the coupling identifier "X00".

The original data of the cache data "1" exists in a region of the address "0x000120" of the LDEV "00:20:03".

The size of the cache data "1" is "84 MB".

The cache data "1" exists at the address "0x000204" of the external cache 120*a*.

The date and time at which the cache data "1" is last accessed is "2011/11/01 19:30:00".

FIG. 7 is a configuration diagram of the external cache reference frequency table 242.

The external cache reference frequency table 242 exists in the storage apparatus 20. The external cache reference frequency table 242 includes a data identifier 242a, a disk identifier 242b, an access-source operation host identifier 242c, and an access date and time 242d for each cache data. These pieces of information are as follows.

The data identifier 242a is an identifier of the cache data.

The LDEV identifier 242b is an identifier of an LDEV that can be a reading source of the original data of the cache data.

The access-source operation host identifier 242c is an identifier of an operation host (a "reading-source host" in FIG. 7) that transmits a Read request in which the original data of the cache data is a reading target.

The access date and time 242d represents a date and time at which the cache data is accessed in response to the Read request from the reading-source host.

The following is understood according to the topmost record in the external cache reference frequency table 242.

The original data of the cache data "1" can be read from the LDEV "00:20:03".

The cache data "1" is accessed on "2011/11/01 10:00:00" in response to the Read request from the operation host "HOST_01".

FIG. 8 is a configuration diagram of the operation host table 311.

The operation host table 311 exists in the storage management server 30. The operation host table 311 includes an operation host identifier 311a, an intended use 311b, a cache use availability 311c, a usable period of time 311d, an entire drive free space 311e, a cache use size 311f, a data reference access permission I/O threshold 311g, a data write permission throughput threshold 311h, and access information 311i for each operation host 10. These pieces of information are as follows.

The operation host identifier 311a is an identifier of the operation host 10.

The intended use 311b represents an intended use of the operation host 10.

The cache use availability 311c represents whether or not the actual external cache 120a of the operation host 10 is usable.

The usable period of time 311d represents a period during which the use as the actual external cache 120a is available.

The entire drive free space 311e represents free space of the entire drive 131 of the operation host 10.

The cache use size 311f represents the size of a region used as the actual external cache 120a, of the total capacity of the drive 131.

The data reference access permission I/O threshold 311g represents a threshold of an I/O speed (an amount of data inputted/outputted per unit time) of the drive 131, the threshold serving to determine the use availability of a storage region to be defined as the actual external cache of the operation host 10.

The data write permission throughput threshold 311h is a lower limit value of network throughput (data transfer rate) at which writing into the external cache 120a is permitted.

The access information 311i is information (for example, a user ID and a password) used for communications with the operation host 10.

The following is understood according to the topmost record in the operation host table 311.

The operation host "HOST_01" is used for "Data calculation", the use as an external cache is available, and the usable period of time as the external cache is "2011/11/01 to 2011/11/10".

The entire drive free space of the operation host "HOST_01" is 30 GB, and the cache use size of the entire drive free space is 8 GB.

The data reference access permission I/O threshold of the operation host "HOST_01" is "80 Mb/Sec", and the data write permission throughput threshold of the operation host "HOST_01" is "50 Mb/Sec".

The access information of the operation host "HOST_01" is "UserID/Pass".

FIG. 9 is a configuration diagram of the operation host working state table 312.

The operation host working state table 312 exists in the storage management server 30. The operation host working state table 312 includes an operation host identifier 312a, a measurement time 312b, a Read average I/O 312c, a Write average I/O 312d, a network reception average throughput 312e, a network transmission average throughput 312f, and a cache use size 312g for each operation host 10. These pieces of information are as follows.

The operation host identifier 312a is an identifier of the operation host 10.

The measurement time 312b represents a period of time during which a working state of the operation host 10 is measured (a start date and time and an end date and time of the measurement).

The Read average I/O 312c represents an average value of a reading speed of the operation host 10. Note that this speed is a speed of reading data from the storage apparatus 20, and a speed of reading data from the external cache 120a may be excluded. Further, information indicating a different type of Read load (for example, a Read average response time (an average time between issuing of a Read request and reception of a response thereto) may be adopted instead of the Read average I/O 312c.

The Write average I/O 312d represents an average value of a writing speed of the operation host 10. Note that this speed may be a speed of writing data into the storage apparatus 20. Further, information indicating a different type of Write load (for example, a Write average response time (an average time between issuing of a Write request and reception of a response thereto) may be adopted instead of the Write average I/O 312d.

The network reception average throughput 312e represents an average value of network reception throughput of the operation host 10. The network reception throughput refers to an amount of data that is received by the operation host 10 through the network (in the present example, the SAN 60) per unit time. Information indicating a different type of communication load may be adopted instead of the throughput 312e.

The network transmission average throughput 312f represents an average value of network transmission throughput of the operation host 10. The network transmission throughput refers to an amount of data that is transmitted by the operation host 10 through the network (in the present example, the SAN 60) per unit time. Information indicating a different type of communication load may be adopted instead of the throughput 312f.

The cache use size 312g represents the size of a storage region used as the external cache 120a in the operation host 10.

Figure 10:
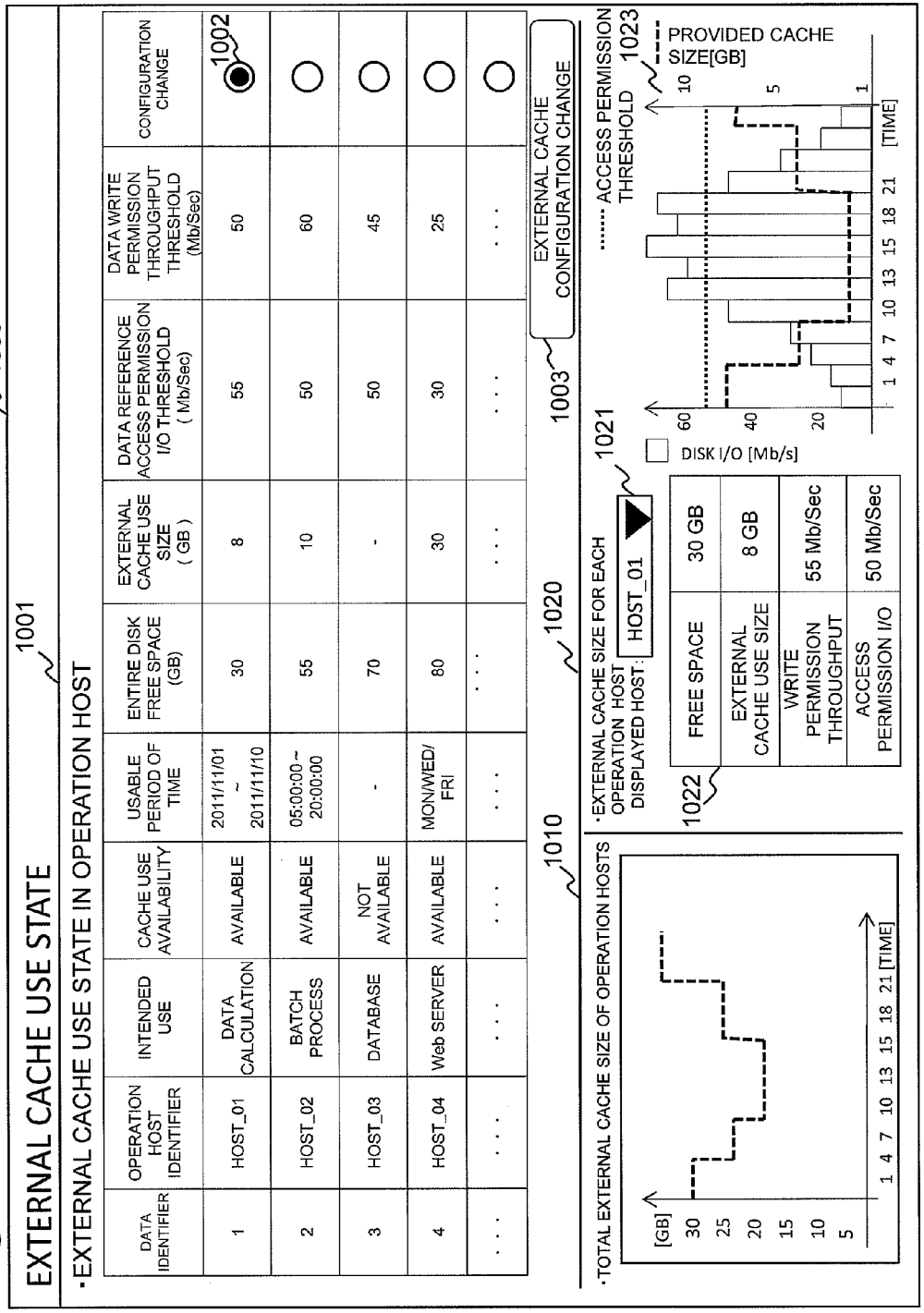
FIG. 10 is a diagram illustrating an external cache use state screen according to Example 1.
Figure 11:
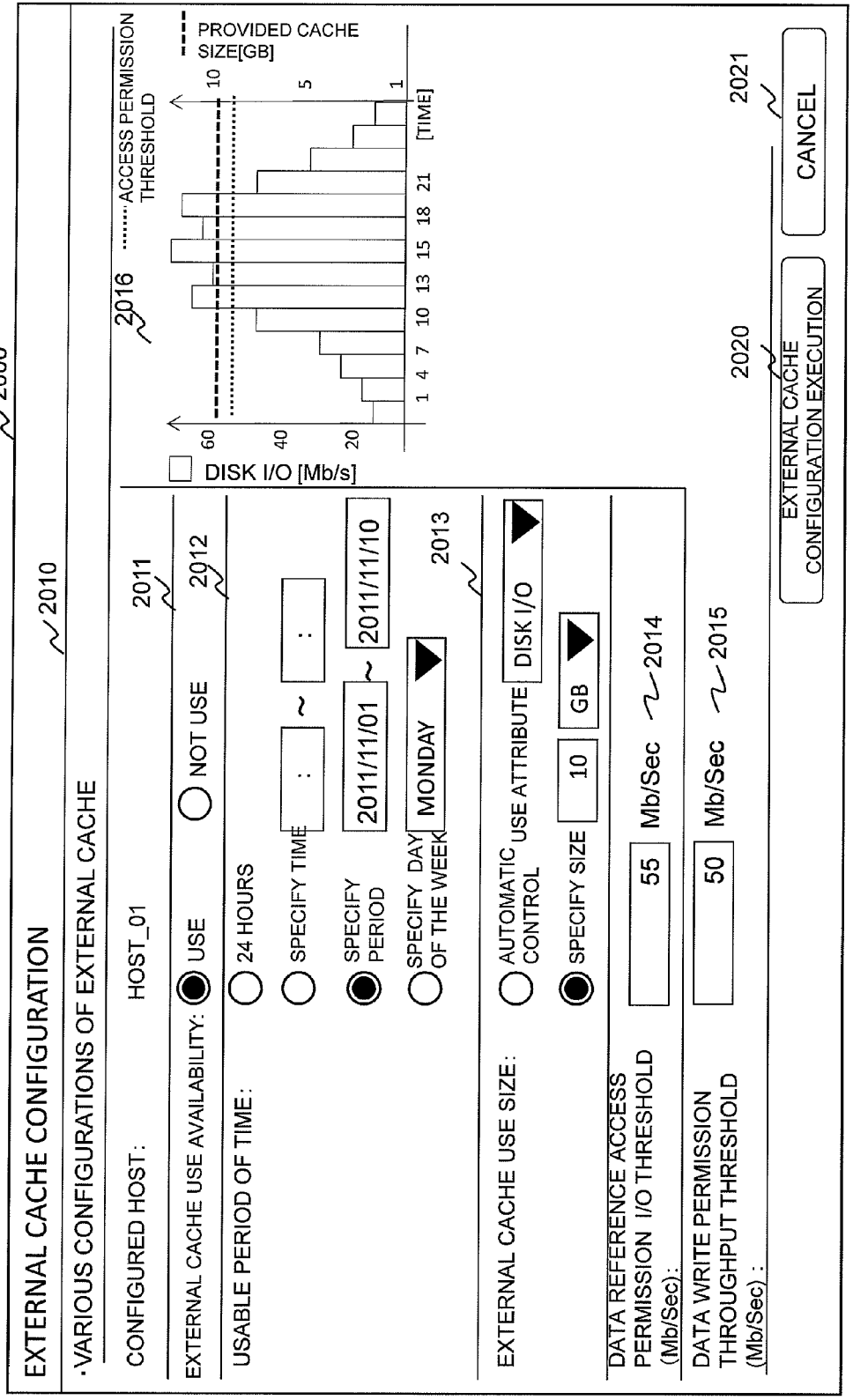
FIG. 11 is a diagram illustrating an external cache configuration screen according to Example 1.

Next, some example screens that the storage management server 30 displays on the management computer 40 are described with reference to FIG. 10 and FIG. 11. Note that screen components (for example, a text box or a radio button) for an intended purpose are illustrated in FIG. 10 and FIG. 11, but the screen components are not limited to those illustrated in FIG. 10 and FIG. 11. Further, the screens illustrated in FIG.

10 and FIG. 11 are displayed when the server control device 341 implements a predetermined computer program (for example, the driver controlling module 301).

FIG. 10 illustrates an external cache use state screen according to Example 1.

When receiving an instruction to display the use state screen from the management computer 40 (or when another predetermined event occurs), the storage management server 30 displays an external cache use state screen 1000 onto the management computer 40.

The external cache use state screen 1000 includes an external cache use state displaying region 1001, a total external cache size displaying region 1010, and an operation host-based state displaying region 1020.

In the external cache use state displaying region 1001, displayed for each operation host is information concerning the use state of the actual external cache 120a existing in the operation host 10 managed by the storage management server 30. In Example 1, information stored in the operation host table 311 is displayed for each operation host. A change specifying radio button 1002 and an external cache configuration change button 1003 are displayed in the displaying region 1001. The button 1002 serves to specify the operation host 10 that is a target of change in configuration of the actual external cache 120a. The button 1003 serves to display an external cache configuration screen (see FIG. 11) for changing the configuration of the actual external cache 120a of the operation host 10 specified by the change specifying radio button 1002.

In the total external cache size displaying region 1010, displayed is a graph showing the total external cache size of the plurality of operation hosts 10 managed by the storage management server 30. In Example 1, the graph displayed in the total external cache size displaying region 1010 shows, for example, a relation between time and the total size of the actual external caches 120a. The transition of the total size of the actual external caches 120a with an elapse of time can be known according to this graph.

In the operation host-based state displaying region 1020, displayed is information concerning the use state of the actual external cache 120a of any of the operation hosts 10. In Example 1, a pull-down menu 1021, an individual information displaying region 1022, and an individual graph displaying region 1023 are displayed in the displaying region 1020. The pull-down menu 1021 serves to make a selection from a list of the operation hosts 10. The region 1022 serves to show the use state of the operation host 10 selected from the list displayed on the pull-down menu 1021. The region 1023 serves to display a graph showing a relation between: the external cache size (the size of the actual external cache 120a) and disk I/O of the operation host 10 selected on the pull-down menu 1021; and time. This graph is created on the basis of the operation host working state table 312 of the storage management server 30. Specifically, for example, the disk I/O at each time is identified from the Read average I/O 312c and the Write average I/O 312d corresponding to each measurement time 312b, and the external cache size at each time is identified from the last access date and time 241h corresponding to each measurement time 312b.

FIG. 11 is a diagram illustrating the external cache configuration screen according to Example 1.

When receiving a report that the external cache configuration change button 1003 is pushed on the screen 1000 of FIG. 10, from the management computer 40 (or when another event occurs), the storage management server 30 displays an external cache configuration screen 2000 onto the management computer 40. Note that the report that the external cache configuration button 1003 is pushed may include information (for example, the operation host identifier) concerning the operation host 10 specified by the change specifying radio button 1002 on the screen 1000 of FIG. 10.

In the external cache configuration screen 2000, displayed are a configuration changing region 2010, an external cache configuration execution button 2020, and a cancel button 2021. The region 2010 serves to change the configuration of the operation host 10 specified as a change target. The button 2020 serves to implement the configuration specified in the configuration changing region 2010. The button 2021 serves to undo (cancel) the configuration specified in the configuration changing region 2010.

In the configuration changing region 2010, displayed are a use availability configuring region 2011, a usable period-of-time configuring region 2012, a use size configuring region 2013, an I/O threshold configuring region 2014, and a throughput threshold configuring region 2015. The region 2011 serves to configure whether or not the drive 121 of the corresponding operation host 10 can be used as the actual external cache 120a. The region 2012 serves to configure time (period) during which the use as the actual external cache 120a is permitted. The region 2013 serves to configure a storage size that can be used as the actual external cache 120a. The region 2014 serves to configure an I/O threshold (data reference access permission I/O threshold) that is a criterion for permitting data reference to the actual external cache 120a. The region 2015 serves to configure network throughput threshold (data write permission throughput threshold) that is a criterion for permitting data writing into the actual external cache 120a.

In Example 1, the usable period-of-time configuring region 2012 includes, 24 hours for permitting the use all the time, specify time for configuring usable time, specify period for configuring usable period, and specify day of the week for configuring a usable day of the week, any of which can be selected. Information to be specified can be inputted in each corresponding region.

The use size configuring region 2013 includes: an automatic control configuring region for making such a configuration that the size of the actual external cache 120a is dynamically configured; and a size specifying region for making such a configuration that the size of the actual external cache 120a is a fixed value. In Example 1, the automatic control configuring region includes an attribute selection list box for selecting an attribute (for example, disk I/O) used for determining the size. Note that information indicating whether the size of the actual external cache 120a is a variable value that is dynamically changed in an automatic manner or is a fixed value that is manually configured is stored in, for example, the memory 355 of the storage management server 30. If the size of the actual external cache 120a is such a variable value, the external cache region calculating module 303 regularly (or irregularly) carries out an external cache region calculating process (FIG. 20), and the size of the actual external cache 120a may be changed so as to have a size obtained through this calculating process.

Next, processes performed in the computer system according to Example 1 are described.

Figure 12:
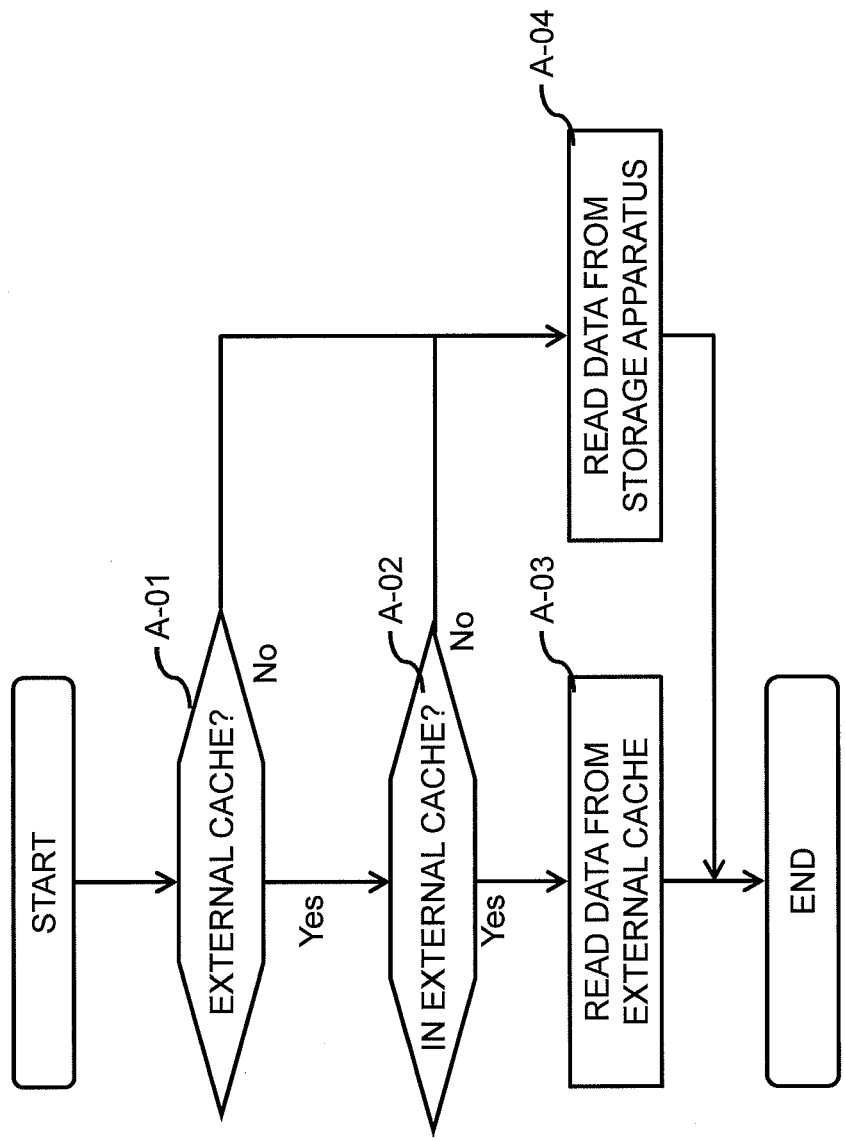
FIG. 12 is a flow chart of a data reading process of an operation host according to Example 1.

FIG. 12 is a flow chart of a data reading process of the operation host 10.

The data reading process is carried out by the data read controlling module 111, for example, when the cache control program 110 detects reading from the disk 184.

The data read controlling module 111 determines whether or not the actual external cache 120a exists in the operation host 10 that implements this module 111 (Step A-01).

Whether or not the external cache exists can be determined by whether or not a record exists in the external cache management table 131.

As a result, if the actual external cache 120a does not exist (No in Step A-01), the data read controlling module 111 moves the process to Step A-04.

On the other hand, if the actual external cache 120a exists (Yes in Step A-01), on the basis of whether or not a record corresponding to reading target data (Read data) exists in the external cache management table 131, the data read controlling module 111 determines whether or not the Read data exists (is cached) in the actual external cache 120a (Step A-02). Specifically, the data read controlling module 111 determines whether or not a record that stores values corresponding to a coupling identifier and a data address included in a Read request exists.

As a result, if the Read data corresponding to the actual external cache 120a does not exist (No in Step A-02), the data read controlling module 111 moves the process to Step A-04.

On the other hand, if the Read data corresponding to the external cache exists (Yes in Step A-02), the data read controlling module 111 reads the Read data from the actual external cache 120a, and returns the acquired Read data to the operation application 100 (Step A-03). Here, a storage area of the Read data can be identified by values of the cache address 131g and the cache size 131e of the corresponding record in the external cache management table 131. In this way, the Read data can be rapidly delivered to the operation application 100 without the need to read the Read data from the storage apparatus 20.

In Step A-04, the data read controlling module 111 transmits a Read request to the storage apparatus 20. Consequently, the data read controlling module 111 can then receive the Read data as a response to the Read request from the storage apparatus 20.

Note that whether or not the actual external cache 120a exists is not taken into consideration in a data writing process of the operation host 10. In the case where writing into the disk 184 occurs by means of the operation application 100, the operation host 10 transmits, to the storage apparatus 20 including an LDEV corresponding to this disk 184, a Write request in which the LDEV is specified.

Figure 13:
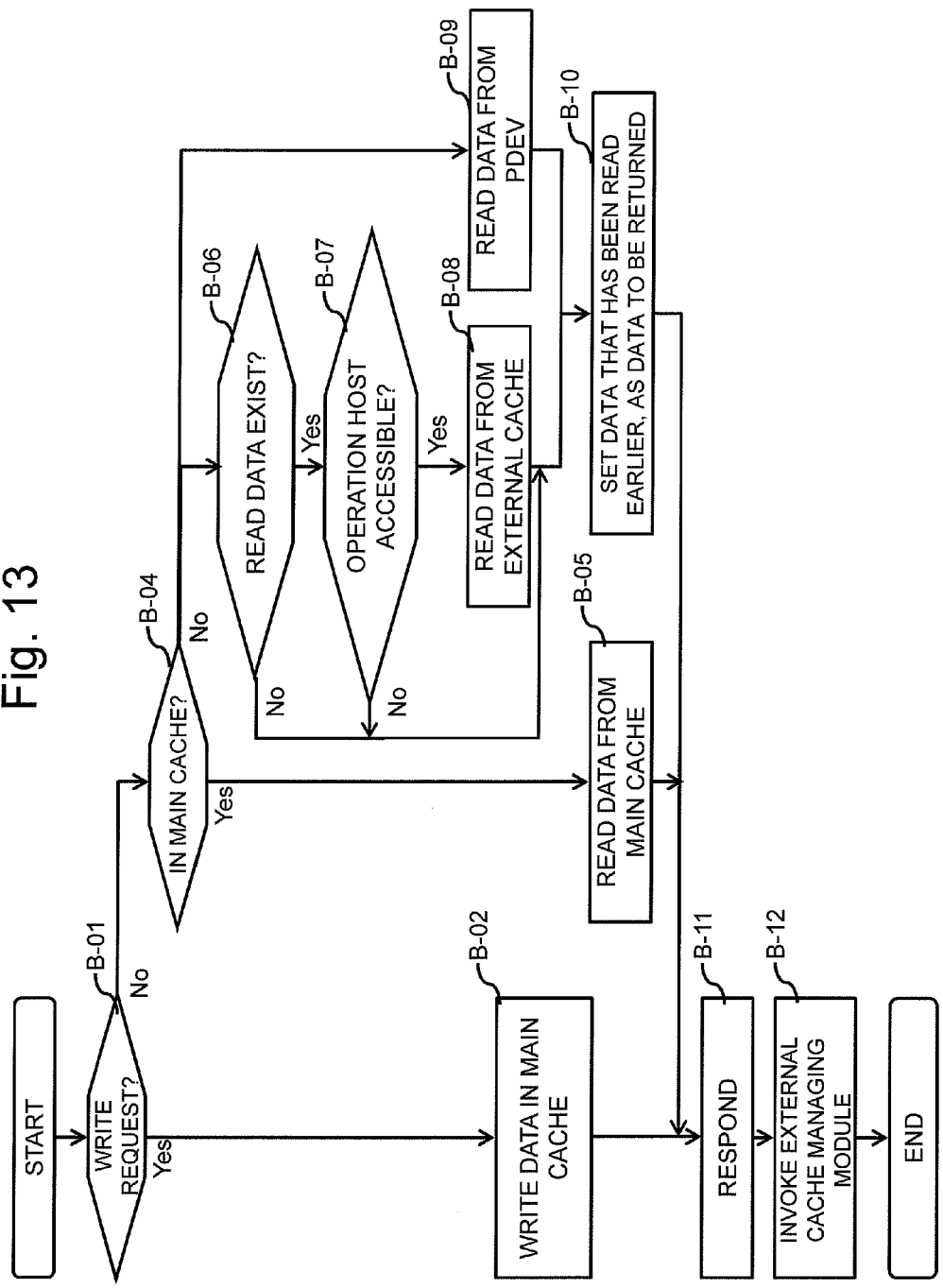
FIG. 13 is a flow chart of a data reading/writing process of a storage apparatus according to Example 1.

FIG. 13 is a flow chart of a data reading/writing process of the storage apparatus 20.

The data reading/writing process is carried out when the storage control device 281 of the storage apparatus 20 implements the data read/write controlling module 211. The data reading/writing process is started, for example, when the storage apparatus 20 receives a Write request or a Read request (or when another predetermined event occurs). In the following description, an LDEV specified in the Write request is referred to as "writing-destination LDEV", and an LDEV specified in the Read request is referred to as "reading-source LDEV".

The data read/write controlling module 211 determines whether or not a received request is the Write request (Step B-01). If the received request is the Read request (No in Step B-01), the data read/write controlling module 211 moves the process to Step B-04.

On the other hand, if the received request is the Write request (Yes in Step B-01), the data read/write controlling module 211 starts a writing process. That is, the data read/write controlling module 211 writes data associated with the Write request into the main cache 221 (Step B-02). Before writing the data written in the main cache 221 into the PDEV 231 that is the basis for the writing-destination LDEV, the read/write controlling module 211 transmits a response to the Write request to the operation host 10 as a transmission source of the Write request (Step B-11). Then, the read/write controlling module 211 invokes the external cache managing module 212. Note that the read/write controlling module 211 may perform Step B-11 in the case of writing the data written in the main cache 221 into the PDEV 231.

Figure 14:
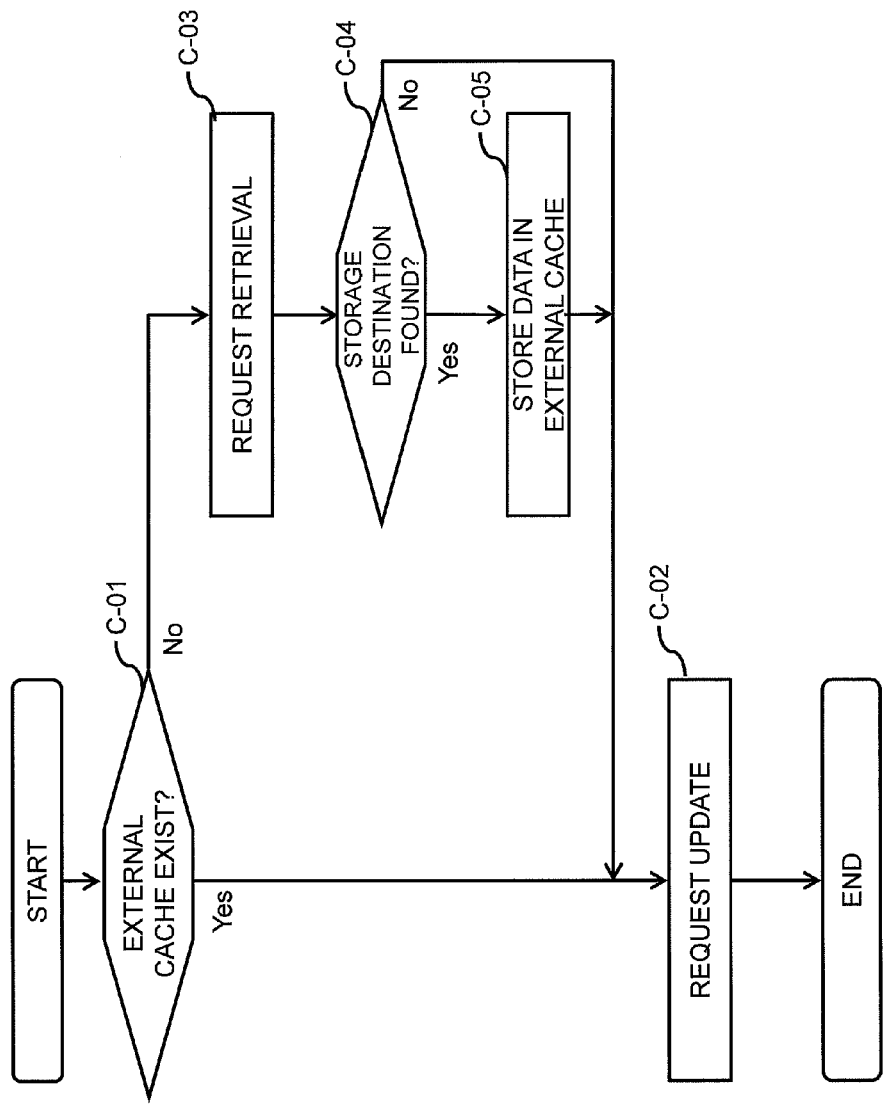
FIG. 14 is a flow chart of an external cache managing process according to Example 1.

After Step B-11, the data read/write controlling module 211 invokes the external cache managing module 212 (Step B-12). Consequently, the external cache managing module 212 carries out an external cache managing process (FIG. 14).

On the other hand, in Step B-04, the data read/write controlling module 211 determines whether or not reading target data (Read data) associated with the Read request exists in the main cache 221 (Step B-04).

As a result, if the Read data exists in the main cache 221 (Yes in Step B-04), the data read/write controlling module data 211 reads the Read data from the main cache 221, and moves the process to Step B-11. Note that a method of managing data in the main cache 221 is known, and hence detailed description thereof is omitted here.

On the other hand, if the target Read data does not exist in the main cache 221 (No in Step B-04), the data read/write controlling module 211 carries out a process from Step B-06 (a process of reading data from the actual external cache 120a) in parallel with a process from Step B-09 (a process of reading data from the PDEV 231).

In Step B-06, the data read/write controlling module 211 determines whether or not a record corresponding to the Read data exists in the external cache allocation table 241. Specifically, for example, the data read/write controlling module 211 determines whether or not a record that stores values matching with a coupling identifier and a data address included in the Read request exists in the external cache allocation table 241. As a result, if such a record does not exist in the external cache allocation table 241 (No in Step B-06), the data read/write controlling module 211 moves the process to Step B-10. On the other hand, if such a record exists in the external cache allocation table 241 (Yes in Step B-06), the data read/write controlling module 211 requests the external cache retrieving module 302 of the storage management server 30 to carry out an access availability determining process, which is a process of determining whether or not the operation host 10 including the actual external cache 120a corresponding to this record is accessible (Step B-07). Note that the access availability determining process by the external cache retrieving module 302 is performed in an external cache retrieving process (see FIG. 15). As a result, if not accessible (No in Step B-07), the data read/write controlling module 211 moves the process to Step B-10. On the other hand, if accessible (Yes in Step B-07), the data read/write controlling module 211 reads the Read data from the actual external cache 120a of the found operation host 10 (Step B-08). Note that a process in Step B-08 (specifically, a process after No in Step B-01) is performed in the case where the Read data does not exist in the actual external cache 120a of the host 10 as a transmission source of the Read request. This is because, as illustrated in FIG. 12, if the Read data exists in the actual external cache 120a of the operation host 10 as the transmission source of the Read request, Step A-04 (transmission of the Read request to the storage apparatus 20) is not performed.

Meanwhile, in Step B-09, the data read/write controlling module 211 reads the Read data from the PDEV 231 that is the basis for the reading-source LDEV, and moves the process to Step B-10.

In Step B-10, the data read/write controlling module 211 sets Read data that has been read earlier between the process from Step B-06 (the process of reading the data from the actual external cache 120a) and the process from Step B-09 (the process of reading the data from the PDEV 231), as data to be transmitted as a response to the Read request to the operation host 10, and moves the process to Step B-11. Then, the data read/write controlling module 211 returns the response to the Read request, that is, the response including the acquired Read data, to the operation host 10 as the transmission source of the Read request (Step B-11), and invokes the external cache managing module 212 (Step B-12).

According to the process illustrated in FIG. 13, in the case where the Read data is read from the actual external cache 120a earlier than from the PDEV 231, the Read data can be transmitted to the operation host 10 at earlier timing compared with the case where the Read data is read from only the PDEV 231. Note that the following can be conceived as situations in which data reading from the actual external cache 120a is expected to be earlier than data reading from the PDEV 231. For example, (1) the PDEV 231 that is the basis for the reading-source LDEV also serves as the basis for another LDEV, and this PDEV that is the basis for the reading-source LDEV is in a busy state because a data reading process is being performed on the another LDEV. (2) The PDEV 231 is an HDD, and a rotational delay of the disk is long. (3) The PDEV 231 is an HDD, a rotational speed of the HDD is suppressed in a power saving mode, and it takes a while to increase the rotational speed.

FIG. 14 is a flow chart of the external cache managing process according to Example 1.

The external cache managing process is carried out by the external cache managing module 212 when data reading and data writing occur (Step B-12 in FIG. 13) or when data existing in the main cache 221 is overwritten or deleted.

The external cache managing module 212 refers to the external cache allocation table 241, and determines whether or not the virtual external cache 392 (actual external cache 120a) that stores target data exists when the external cache managing process is carried out (Step C-01). As a result, if the virtual external cache 392 exists (Yes in Step C-01), the external cache managing module 212 moves the process to Step C-02. Note that the "target data" here refers to data to be overwritten or deleted or the Read data described in FIG. 13.

On the other hand, if the virtual external cache 392 does not exist (No in Step C-01), the external cache managing module 212 performs a process of newly creating the virtual external cache 392. That is, the external cache managing module 212 requests the external cache retrieving module 302 to carry out data storage destination retrieval in which the operation host 10 as a storage destination of the data is retrieved (Step C-03). Here, upon the reception of this request, the external cache retrieving module 302 carries out the external cache retrieving process (see FIG. 15).

Then, the external cache managing module 212 determines whether or not the actual external cache 120a as the storage destination of the target data has been found as a result of the external cache retrieving process (Step C-04). If the actual external cache 120a as the storage destination has been found (Yes in Step C-04), the external cache managing module 212 creates the virtual external cache 392, maps the found actual external cache 120a to the virtual external cache 392, stores the target data into the actual external cache 120a through the virtual external cache 392 (Step C-05), and moves the process to Step C-02. In this way, the target data can be stored into the actual external cache 120a of the operation host 10. On the other hand, if the actual external cache 120a as the storage destination has not been found (No in Step C-04), the external cache managing module 212 moves the process to Step C-02.

In Step C-02, the external cache managing module 212 requests the external cache allocation updating module 214 to update the data (Step C-02). Consequently, the external cache allocation updating module 214 carries out an external cache allocation updating process (see FIG. 16).

Note that, between Yes in Step C-04 and Step C-05, the external cache managing module 212 may request the external cache retrieving module 302 to determine access availability at the time of writing, specifically, to determine whether or not the found operation host is accessible. As a result, if a report that the access is not available is received, the external cache managing module 212 waits for a given length of time without starting carrying out Step C-05, and may make the request again. If a report that the access is available is received (or if waiting for a given length of time is repeated a predetermined number of times or more), the external cache managing module 212 may carry out Step C-05.

Figure 15:
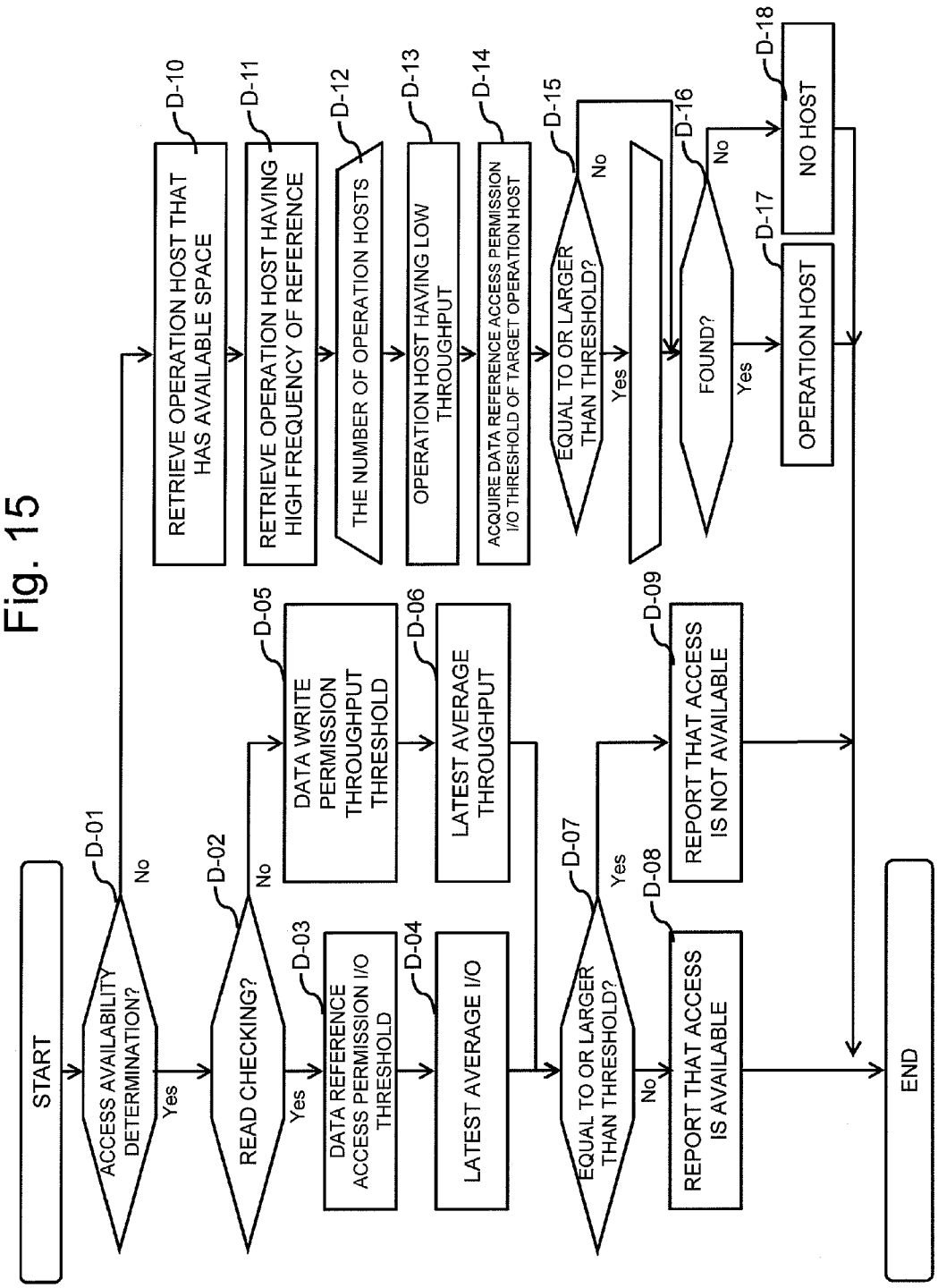
FIG. 15 is a flow chart of an external cache retrieving process according to Example 1.

FIG. 15 is a flow chart of the external cache retrieving process according to Example 1.

The external cache retrieving process is carried out by the external cache retrieving module 302 when an inquiry of access availability is received (Step B-07 in FIG. 13) or when a request to retrieve the external cache of a data storage destination is received (Step C-03 in FIG. 14).

The external cache retrieving module 302 determines whether or not a request is a request to determine access availability (Step D-01). As a result, if the request is the request to determine access availability (Yes in Step D-01), the external cache retrieving module 302 moves the process to Step D-02. On the other hand, if the request is a request to retrieve the operation host 10 that provides the actual external cache 120a (No in Step D-01), the external cache retrieving module 302 moves the process to Step D-10.

In Step D-02, the external cache retrieving module 302 determines whether or not the request to determine is determination at the time of reading. If the request to determine is the determination at the time of reading (Yes in Step D-02), the external cache retrieving module 302 acquires the data reference access permission I/O threshold 311g of a target operation host (for example, an operation host as a transmission source of a Write request or a Read request) from the operation host table 311 (Step D-03). Then, the external cache retrieving module 302 acquires the latest Write average I/O 312d and the latest Read average I/O 312c of the target operation host 10 from the operation host working state table 312, averages these values to calculate average I/O (Step D-04), and moves the process to Step D-07. A value based on the I/Os 312d and 312c, for example, a smaller or larger one of the I/Os 312d and 312c may be adopted instead of the average I/O.

On the other hand, if the request to determine is determination at the time of writing (No in Step D-02), the external cache retrieving module 302 acquires the data write permission throughput threshold 311h of the target operation host 10 from the operation host table 311 (Step D-05). Then, the external cache retrieving module 302 acquires the latest network reception average throughput 312e and the latest network transmission average throughput 312f of the target operation host 10 from the operation host working state table 312, averages these values to calculate average throughput (Step D-06), and moves the process to Step D-07. A value based on the throughputs 312e and 312f, for example, a smaller or larger one of the throughputs 312e and 312f may be adopted instead of the average throughput.

In Step D-07, the external cache retrieving module 302 determines whether or not the average value (the average I/O or the average throughput) is equal to or larger than the threshold 311g or 311h of the target operation host 10. As a result, if the average value is smaller than the threshold (No in Step D-07), the external cache retrieving module 302 transmits a report that the actual external cache 120a of the target operation host 10 is accessible, to the storage apparatus 20 (Step D-08). On the other hand, if the average value is equal to or larger than the threshold (Yes in Step D-07), the external cache retrieving module 302 transmits a report that the actual external cache 120a of the target operation host 10 is not accessible, to the storage apparatus 20 (Step D-09).

If the average value is equal to or larger than the threshold, even if data is read from the actual external cache 120a of the target operation host 10, the reading takes a long time, and hence data read from the PDEV 231 is more likely to be returned in Step B-10 in FIG. 13. According to the process of FIG. 15, if the average value is equal to or larger than the threshold, the access to the actual external cache 120a of the target operation host 10 is avoided, and hence a load on the target operation host 10 can avoid increasing uselessly.

In the meantime, if the request is the request to retrieve the operation host 10 (No in Step D-01), the external cache retrieving module 302 retrieves the operation host 10 whose drive 121 has free space equal to or larger than the size of storage target data, on the basis of the operation host table 311 (Step D-10).

Then, the external cache retrieving module 302 refers to information included in the external cache reference frequency table 242 of the storage apparatus 20, and retrieves the operation host 10 having high frequency of reference to the storage target data, from among the operation hosts 10 found in Step D-10 (Step D-11). For example, the external cache retrieving module 302 retrieves the operation host 10 having a number of references in a predetermined period, the number being equal to or larger than a predetermined number.

Then, the process (Steps D-12 to D-15) is repeatedly carried out a number of times corresponding to the number of the operation hosts 10 found in Step D-11.

First, the external cache retrieving module 302 identifies the operation host 10 having the lowest throughput as a target of the process (Steps D-12 to D-15), from among the operation hosts 10 that have been found in Step D-11 and have not been subjected to the process (Step D-12 to Step D-15), on the basis of the operation host working state table 312 (Step D-13). Then, the external cache retrieving module 302 acquires the data reference access permission I/O threshold 311g of the operation host 10 identified in Step D-13, from the operation host table 311 (Step D-14). Then, the external cache retrieving module 302 compares the data reference access permission I/O threshold 311g acquired in Step D-14 with the average I/O (obtained by averaging the latest Write average I/O 312d and the latest Read average I/O 312c) of the operation host 10 identified in Step D-13 (Step D-15).

As a result, if the average I/O is equal to or larger than the threshold 311g (Yes in Step D-15), the external cache retrieving module 302 continuously performs the process from Step D-12. On the other hand, if the average I/O is less than the threshold 311g (No in Step D-15), the external cache retrieving module 302 determines the operation host 10 identified in Step D-13 as the target operation host 10 that provides the actual external cache 120a, ends the process (Steps D-12 to D-15), and moves the process to Step D16. Note that, in the case where all the operation hosts 10 found in Step D-11 have been subjected to the process (Steps D-12 to D-15), the external cache retrieving module 302 moves the process to Step D-16.

In Step D-16, the external cache retrieving module 302 determines whether or not the target operation host 10 that provides the external cache has been found. If the target operation host 10 has been found (Yes in Step D-16), the external cache retrieving module 302 returns information of this operation host 10 (for example, information containing an identifier of this operation host 10) to the storage apparatus 20 (Step D-17). On the other hand, if the target operation host 10 has not been found (No in Step D-16), the external cache retrieving module 302 returns a response to the effect that the target operation host 10 does not exist, to the storage apparatus 20 (Step D-18).

According to the above-mentioned process, the operation host 10 that has high frequency of reference to the target data (for example, the Read data in FIG. 13) and has current average I/O less than a predetermined threshold can be determined as the operation host that provides the external cache. Such an operation host is the operation host 10 having high frequency of reference to the target data, and thus can rapidly acquire the target data from its own drive 121 serving as the external cache, without acquiring the target data from the storage apparatus 20, so that a response at the time of data reading can be enhanced.

Figure 16:
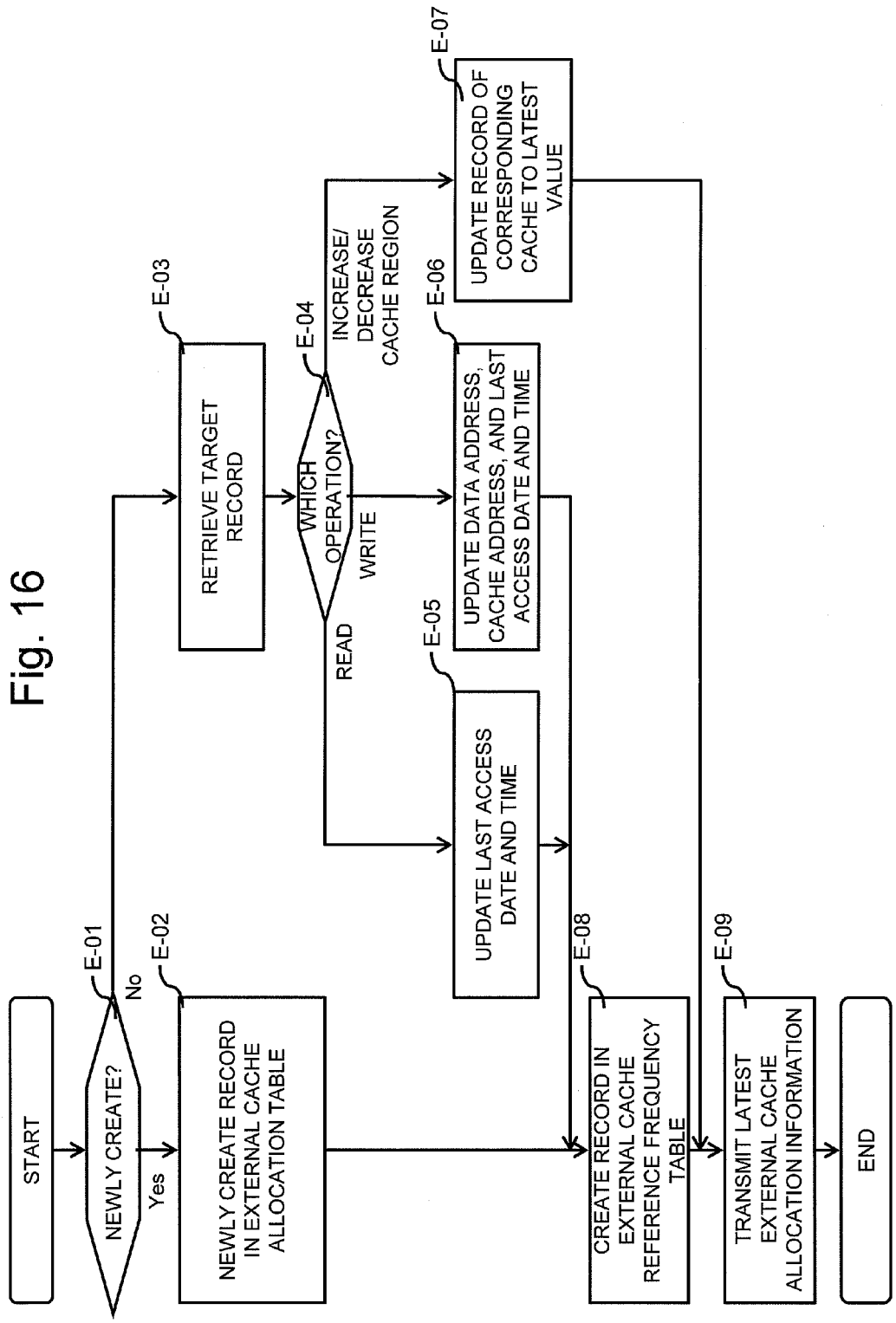
FIG. 16 is a flow chart of an external cache allocation updating process according to Example 1.

FIG. 16 is a flow chart of the external cache allocation updating process according to Example 1.

Figure 21:
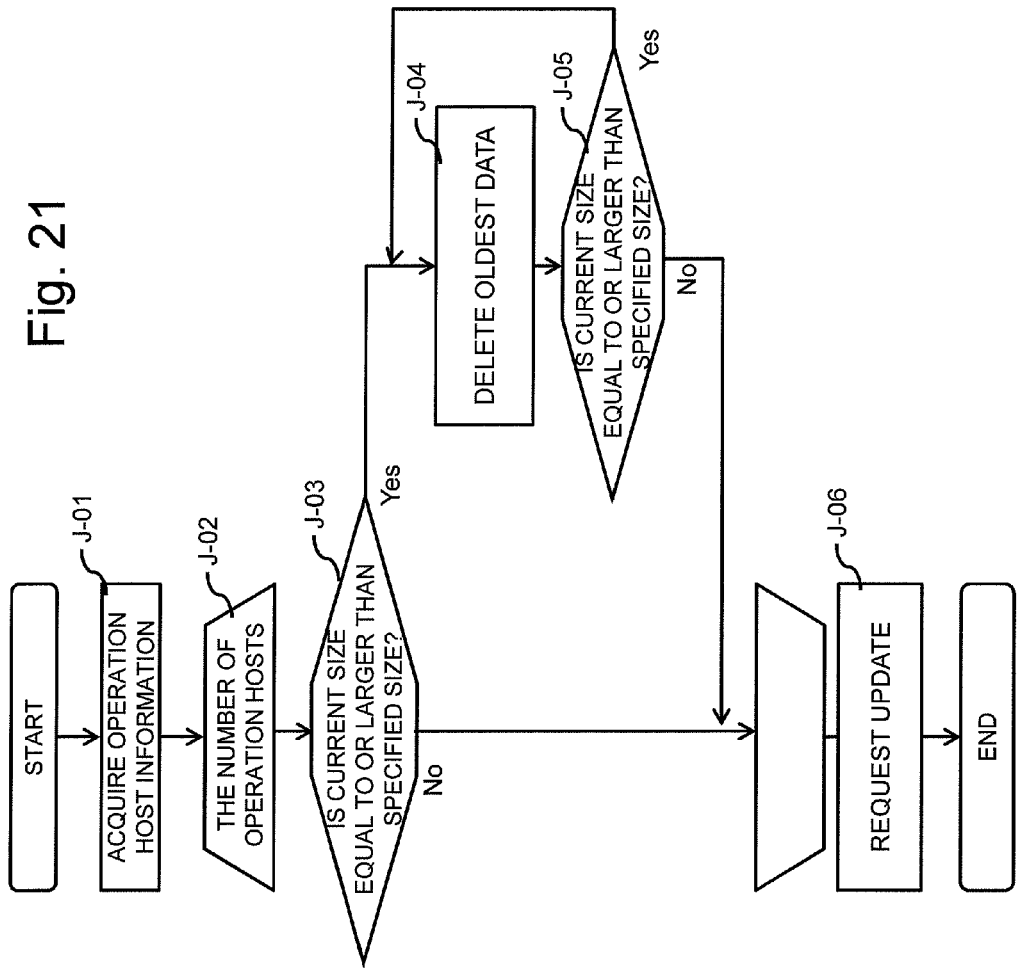
FIG. 21 is a flow chart of an external cache size updating process according to Example 1.

The external cache allocation updating process is carried out by the external cache allocation updating module 213 when a request to update data is received (Step C-02 in FIG. 14 and Step J-06 in FIG. 21).

The external cache allocation updating module 213 determines whether or not an updating process is a process achieved by newly creating a virtual external cache (actual external cache) (Step E-01). As a result, if the updating process is the process achieved by newly creating the virtual external cache (Yes in Step E-01), the external cache allocation updating module 213 newly creates a record in the external cache allocation table 241, stores information of the corresponding virtual external cache (actual external cache) into the record (Step E-02), and moves the process to Step E-08.

On the other hand, if the updating process is not the process achieved by newly creating the virtual external cache (actual external cache) (No in Step E-01), the external cache allocation updating module 213 retrieves a record corresponding to target data from the external cache allocation table 241 on the basis of a data identifier of the target data (Step E-03). Then, the external cache allocation updating module 213 determines an operation on the corresponding data (Step E-04).

If the operation on the data is reading, the external cache allocation updating module 213 updates the last access date and time 241h of the obtained record (Step E-05), and moves the process to Step E-08.

If the operation on the data is writing, the external cache allocation updating module 213 updates the data address 241f, the cache address 241g, and the last access date and time 241h of the obtained record (Step E-06), and moves the process to Step E-08.

If the operation on the data includes increasing/decreasing the cache region, the external cache allocation updating module 213 updates a value of the obtained record to the latest value (Step E-07), and moves the process to Step E-08.

In Step E-08, the external cache allocation updating module 213 adds the record concerning the corresponding data to the external cache reference frequency table 242. Then, the external cache allocation updating module 213 transmits all pieces of information (external cache allocation information) of the record in which any data has been added or changed in the external cache allocation table 241, to the driver controlling module 301 (Step E-09).

Figure 17:
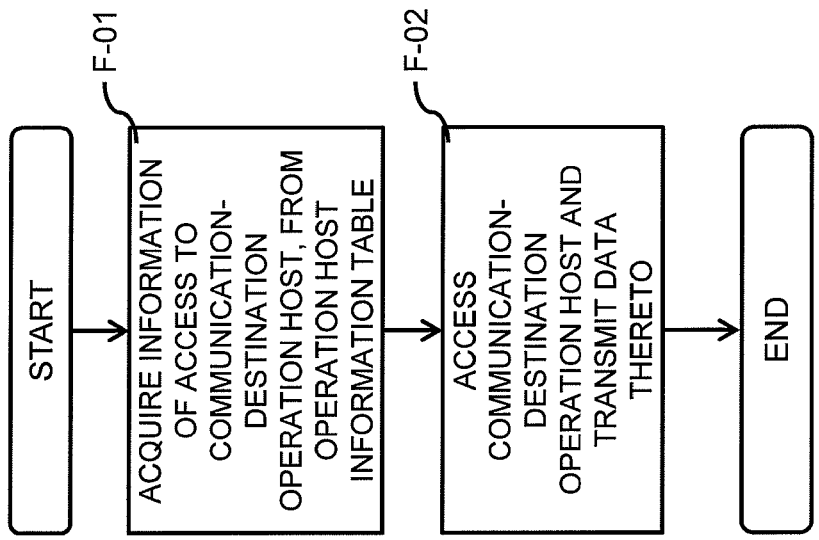
FIG. 17 is a flow chart of an external cache allocation information transmitting process according to Example 1.

FIG. 17 is a flow chart of an external cache allocation information transmitting process according to Example 1.

The external cache allocation information transmitting process is carried out by the driver controlling module 301 when the driver controlling module 301 receives all pieces of information of the record in which any data has been added or changed in the external cache allocation table 241, from the external cache allocation updating module 213 (Step E-09 in FIG. 16).

On the basis of the external cache allocation information received from the external cache allocation updating module 213, the driver controlling module 301 acquires the information 311i of access to the operation host 10 including the actual external cache 120a corresponding to the received information, from the operation host table 311 (Step F-01). The driver controlling module 301 accesses the corresponding operation host 10 on the basis of the acquired access information 311i, and transmits the external cache allocation information thereto (Step F-02).

Figure 18:
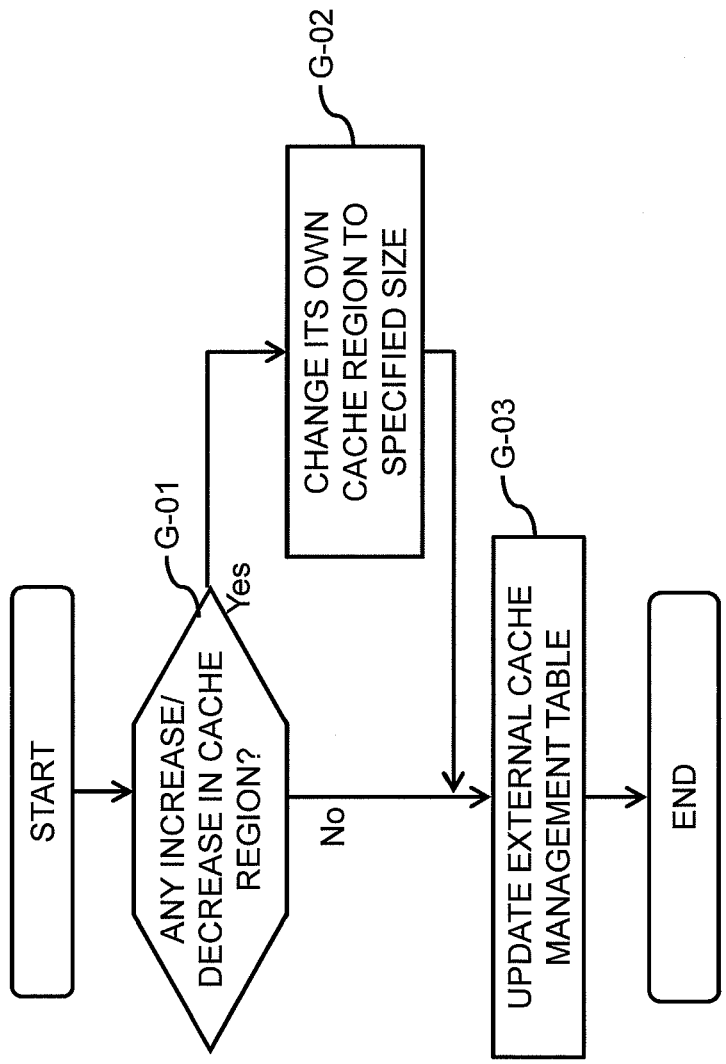
FIG. 18 is a flow chart of an external cache region controlling process according to Example 1.

FIG. 18 is a flow chart of an external cache region controlling process according to Example 1.

The external cache region controlling process is carried out by the external cache region controlling module 112 when the external cache region controlling module 112 receives the external cache allocation information transmitted from the driver controlling module 301 (Step F-02 in FIG. 17).

The external cache region controlling module 112 determines whether or not there is an increase/decrease in cache region, on the basis of the external cache management table 131 and the received external cache allocation information (Step G-01). As a result, if there is not an increase/decrease in cache region size (No in Step G-01), the external cache region controlling module 112 moves the process to Step G-03. On the other hand, if there is an increase/decrease in cache region size (Yes in Step G-01), the external cache region controlling module 112 increases/decreases the cache region to the size of the external cache allocation information (Step G-02), and moves the process to Step G-03.

In Step G-03, the external cache region controlling module 112 stores the external cache allocation information into the external cache management table 131.

According to this process, the operation host 10 can appropriately hold information of its own external cache.

Figure 19:
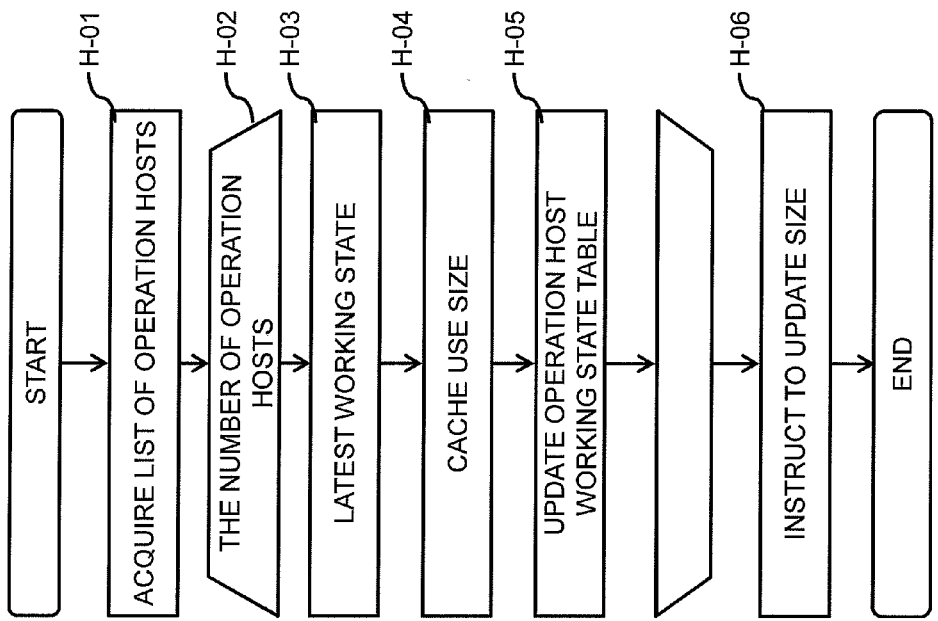
FIG. 19 is a flow chart of a log storing process according to Example 1.

FIG. 19 is a flow chart of a log storing process according to Example 1.

The log storing process is carried out by the log storing module 304 for each period or each time specified in advance by a user on a regular basis.

The log storing module 304 acquires information of a list of the operation hosts 10 under the management of the storage management server 30, from the operation host table 311 (Step H-01). Then, the log storing module 304 repeatedly carries out the process (Steps H-02 to H-05) a number of times corresponding to the number of the acquired operation hosts 10. That is, the log storing module 304 accesses each operation host 10, acquires the latest working state information thereof (Step H-03), and invokes the external cache region calculating module 303. Consequently, the external cache region calculating module 303 carries out the external cache region calculating process (FIG. 20), and calculates and returns the size used as the external cache (cache use size). The log storing module 304 acquires the cache use size (Step H-04), and stores the working state information and the acquired cache use size into the operation host working state table 312 (Step H-05).

Then, in the case where all the acquired operation hosts 10 have been subjected to the process (Steps H-02 to H-05), the log storing module 304 instructs the external cache size updating module 214 of the storage apparatus 20 to update the size (Step H-06). The instruction to update the size here includes information indicating the cache use size calculated for each operation host 10. Consequently, the external cache size updating module 214 carries out an external cache size updating process (see FIG. 21).

Figure 20:
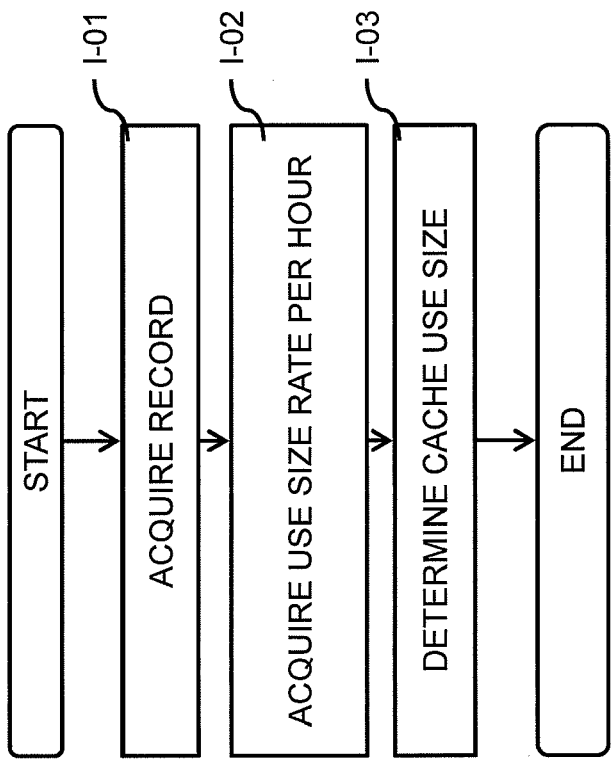
FIG. 20 is a flow chart of an external cache region calculating process according to Example 1.

FIG. 20 is a flow chart of the external cache region calculating process according to Example 1.

The external cache region calculating process is carried out by the external cache region calculating module 303 invoked by the log storing module 304 (Step H-04 in FIG. 19).

The external cache region calculating module 303 acquires a record of the working state of the target operation host 10 whose cache use size is to be calculated, from the operation host working state table 312 (Step I-01). Then, the external cache region calculating module 303 calculates a use size rate per hour according to the following Expression (1) on the basis of the acquired record (Step I-02).

$$\text{Use size rate per hour} = (\text{I/O per hour})/(\text{maximum I/O per 24 hours}) \quad \text{Expression (1)}$$

Note that the I/O per hour may be a value based on the I/Os 312c and 312d (for example, an average value, a minimum value, or a maximum value of the plurality of I/Os 312c and 312d). The maximum I/O per 24 hours may be a maximum value of a plurality of one-day average I/Os (24-hour I/Os).

Then, the external cache region calculating module 303 determines the cache use size according to the following Expression (2).

$$\text{Cache use size} = \text{free space of entire drive} \times (1 - \text{use size rate per hour}) \quad \text{Expression (2)}$$

Then, the external cache region calculating module 303 returns the cache use size to the log storing module 304 (Step I-03).

According to the above-mentioned process, for example, assuming that: the maximum I/O per 24 hours is 6.54 (Mb/Sec); the I/O of the calculation time (23:00 to 24:00) is 1.35 (Mb/Sec); and the free space of the physical drive 121 of the drive 121 of the operation host 10 is 30 GB, the use size rate per hour=1.35/6.54≈0.21, and the cache use size=30×(1−0.21)≈23.7 GB.

Note that, for example, values of one or more information elements collected by the storage management server 30 may be used for a method of calculating the cache use size. For example, the cache use size may be determined on the basis of network throughput. In this case, the cache use size may be configured so as to be smaller in the case where a load on a network traffic increases. Alternatively, the cache use size may be determined on the basis of CPU utilization. In this case, the cache use size may be made smaller in the case where the CPU utilization increases.

FIG. 21 is a flow chart of the external cache size updating process according to Example 1.

The external cache size updating process is carried out by the external cache size updating module 214 invoked by the log storing module 304 (Step H-06 in FIG. 19).

The external cache size updating module 214 acquires information of each operation host 10 from the operation host table 311 (Step J-01).

Then, the external cache size updating module 214 repeatedly carries out the following process (Steps J-02 to J-05) a number of times corresponding to the number of the acquired operation hosts 10. First, the external cache size updating module 214 compares the current cache use size of the operation host 10 as a target of the process (Steps J-02 to J-05) with a specified cache use size (Step J-03).

As a result, if the current cache use size is smaller than the specified cache use size (No in Step J-03), the external cache size updating module 214 changes the target of the process (Steps J-02 to J-05) to the next operation host 10, and performs the process (Steps J-02 to J-05) thereon.

On the other hand, if the current cache use size is equal to or larger than the specified cache use size (Yes in Step J-03), this means that the size used as the cache is large. Hence, the external cache size updating module 214 identifies data of the operation host 10 as the process target from the external cache reference frequency table 242, the data having the oldest access date. Then, the external cache size updating module 214 deletes this data from the external cache of the corresponding operation host 10 (Step J-04).

Then, the external cache size updating module 214 compares the current cache use size of the operation host 10 as the process target with the specified cache use size (Step J-05). As a result, if the current cache use size is smaller than the specified cache use size (No in Step J-05), the external cache size updating module 214 changes the process target to the next operation host 10, and performs the process (Steps J-02 to J-05) thereon. On the other hand, if the current cache use size is equal to or larger than the specified cache use size (Yes in Step J-05), this means that the size used as the cache is large, and hence the external cache size updating module 214 moves the process to Step J-04.

Then, in the case where all the acquired operation hosts have been subjected to the above-mentioned process (Steps J-03 to J-05), the external cache size updating module 214 requests the external cache allocation updating 213 to update the data (Step J-06). Consequently, the external cache allocation updating 213 carries out the external cache allocation updating process (see FIG. 16). According to the above-mentioned process, the size of data cached in the operation host 10 can be made smaller than the specified cache use size, and hence a load on the operation host 10 that is caused by holding the data in the actual external cache 120a can be appropriately reduced.

Note that, in the case of deleting the cache use size in the external cache size updating process described above, data having the oldest access date and time is defined in order as the deletion target, and alternatively, for example, data having the lowest frequency of reference in a predetermined period may be defined in order as the deletion target.

Example 2

Example 2 is described. Hereinafter, different features from those of Example 1 are mainly described, and description of common features with those of Example 1 is omitted or simplified.

Figure 22:
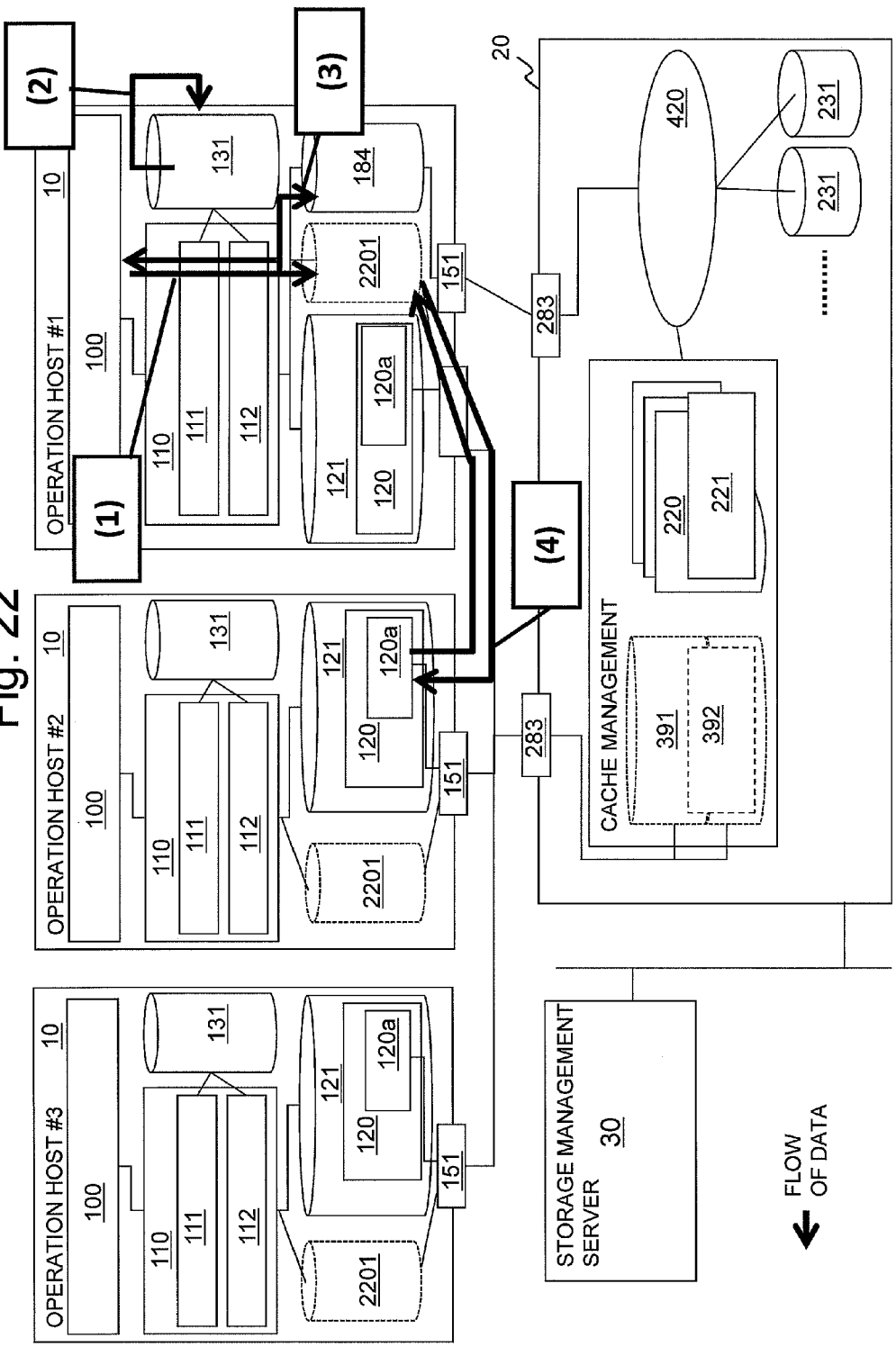
FIG. 22 is a diagram illustrating the outline of a reading process according to Example 2.

FIG. 22 is a diagram illustrating the outline of a reading process according to Example 2. Hereinafter, different features from those of FIG. 3 are mainly described. Note that, in FIG. 22, an operation host #3 is provided in addition to the operation hosts #1 and #2.

The operation host #1 includes a virtual cache 2201 to which the actual external cache 120a of the another operation host #2 is mapped. For example, a storage virtualization technique is applied to this mapping.

If it is determined that Read data is not cached in the actual external cache 120a of the operation host #1, the data read controlling module 111 determines whether or not the actual external cache 120a of the another operation host #2 or #3 is recognized (that is, the operation host #1 includes the virtual cache 2201) ((1) in FIG. 22).

If the actual external cache of the another operation host #2 or #3 is recognized, the data read controlling module 111 determines whether or not the target Read data exists in any operation host 10, on the basis of an external cache management table 132 (see FIG. 23) ((2) in FIG. 22). If the Read data does not exist in any operation host 10, the data read controlling module 111 acquires the Read data according to a process similar to that in Example 1 ((3) in FIG. 22).

In contrast, if the Read data exists in the actual external cache 120a of the another operation host #2 and if the actual external cache 120 is recognized by the operation host #1, the data read controlling module 111 reads the Read data from the actual external cache 120a of the another operation host #2 ((4) in FIG. 22). In this way, the Read data can be expected to be acquired more rapidly compared with reading the Read data from the storage apparatus 20.

FIG. 23 is a configuration diagram of the external cache management table according to Example 2.

The external cache management table 132 additionally includes a storage-destination operation host identifier 131i and an operation host coupling identifier 131j in each record of the external cache management table 131. A storage position in which the data is cached (the operation host 10 and the storage position in the operation host 10) can be identified on the basis of the storage-destination operation host identifier 131i, the operation host coupling identifier 131j, the cache address 131g, and the cache size 131e.

The storage-destination operation host identifier 131i is an identifier of the operation host 10 into which cache data is stored. The operation host coupling identifier 131j is an identifier used to access the actual external cache 120a of another operation host 10.

Figure 24:
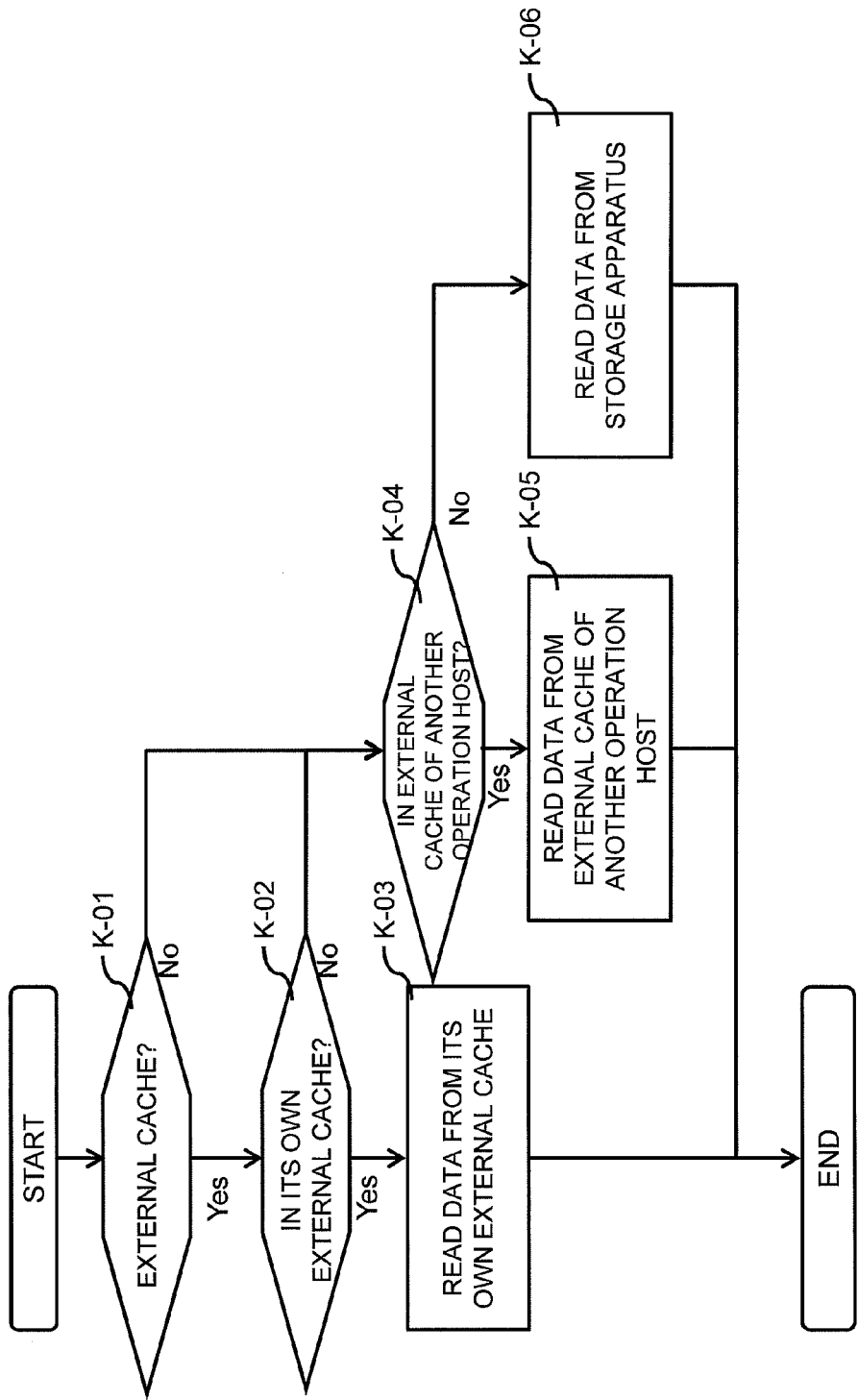
FIG. 24 is a flow chart of a data reading process of an operation host according to Example 2.

FIG. 24 is a flow chart of a data reading process of the operation host 10 according to Example 2.

Steps K-01, K-02, and K-03 are substantially the same as Steps A-01, A-02, and A-03 in FIG. 12, respectively.

If No in Step K-02 (that is, if the Read data does not exist in the actual external cache 120a in its own operation host 10), the data read controlling module 111 moves the process to Step K-04.

In Step K-04, on the basis of whether or not a record corresponding to the Read data exists in the external cache management table 132, the data read controlling module 111 determines whether or not the Read data exists (is cached) in the actual external cache 120a of the another operation host 10. In Step K-04, the data read controlling module 111 may determine whether or not the virtual cache 2201 to which the actual external cache 120a of the another operation host 10 is mapped exists.

If the Read data exists in the actual external cache 120a of the another operation host 10 (Yes in Step K-04), the data read controlling module 111 reads the Read data from the actual external cache 120a of the another operation host 10, and returns the acquired Read data to the operation application 100 (Step K-05). In this way, the Read data can be delivered to the operation application 100 without the need to read the Read data from the storage apparatus 20.

On the other hand, if the Read data does not exist in the actual external cache 120a of the another operation host 10 (No in Step K-04), the data read controlling module 111 transmits a Read request to the storage apparatus 20 (Step K-06). Step K-06 is substantially the same as Step A-04 in FIG. 12.

Figure 25:
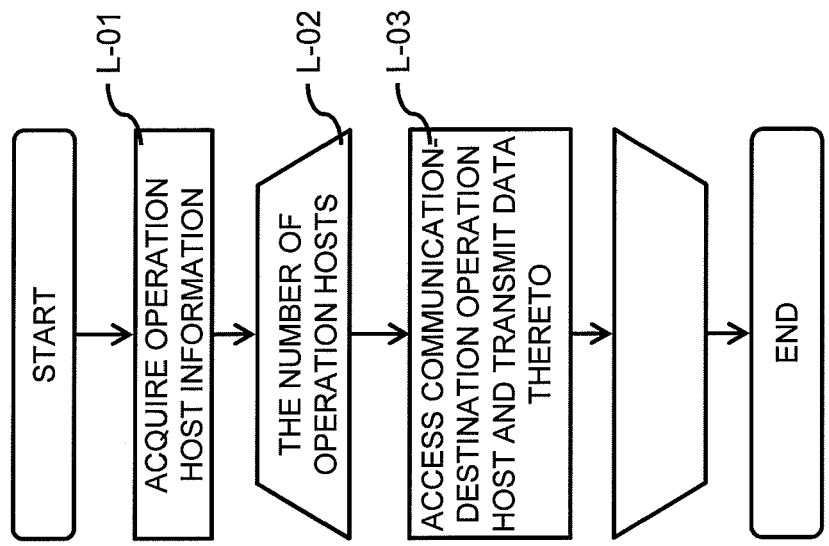
FIG. 25 is a flow chart of an external cache allocation information transmitting process according to Example 2.

FIG. 25 is a flow chart of an external cache allocation information transmitting process according to Example 2.

The driver controlling module 301 acquires the information 311i of access to each operation host 10, from the operation host table 311 (Step L-01). Then, the driver controlling module 301 repeatedly carries out the following process (Steps L-02 to L-03) a number of times corresponding to the number of the acquired operation hosts 10. The driver controlling module 301 accesses the corresponding operation host 10 on the basis of the access information 311*i* of the operation host 10 as the process target among the acquired operation hosts 10, and transmits external cache allocation information thereto (Step L-03). Note that this external cache allocation information additionally contains the storage-destination operation host identifier 131*i* and the operation host coupling identifier 131*j* in the external cache allocation information of Example 1.

Then, in the case where all the acquired operation hosts 10 have been subjected to the process (Steps L-02 to L-03), the driver controlling module 301 ends the external cache allocation information transmitting process.

According to the process of FIG. 25, the external cache management table 132 of each operation host 10 includes not only records of data stored in its own external cache but also records of data stored in the external caches of the other operation hosts 10. That is, each operation host 10 can access data cached in the other operation hosts 10 on the basis of the records in the external cache management table 132.

Hereinabove, some examples have been described, but the present invention is not limited to those examples, and can be applied to various other modes. For example, the configurations of the apparatuses, the screens, the tables, and the like and the processing flows shown by the flow charts are merely given as examples, and the present invention is not limited to the configurations and processing flows described above. Further, in Examples 1 and 2, information in the external cache allocation table 241 is stored from the storage apparatus 20 into the host computer 10 through the storage management server 30, but may be transmitted, for example, from the storage apparatus 20 to the host computer 10 without the intermediation of the storage management server 30. Further, for example, at least part of the functions of the storage management server 30 may be provided in the storage apparatus 20 or the operation host 10. Further, for example, in the storage apparatus 20, the data read/write controlling module 211 may compare the Read data read from the external cache 120*a* with the Read data read from the PDEV 231. If the two pieces of Read data coincide with each other, the data read/write controlling module 211 may return the Read data to the operation host 10.

REFERENCE SIGNS LIST

1: Computer system, 10: Operation host, 20: Storage apparatus, 30: Storage management server, 40: Management computer

The invention claimed is:

1. A computer system, comprising:
one or more host computers configured to transmit an Input/Output (I/O) request; and
one or more storage apparatuses configured to:
  receive the I/O request transmitted from the host computer; and
  process the I/O request,
each storage apparatus comprising:
a first storage device;
a memory, including a main cache that is a cache memory region configured to temporarily store data that is inputted/outputted to/from the first storage device in response to the received I/O request; and
a first control device coupled to the first storage device and the memory,
the host computer comprising:
a second storage device; and
a second control device coupled to the second storage device,
wherein an entirety or a part of free space of the second storage device is an external cache that is a region used as a cache memory region outside of the storage apparatus,
wherein:
  (A) if the I/O is a write, the I/O request is a write request, and the first control device is configured to:
    Write data associated with the write request into the main cache, and
    write the data in the main cache into the first storage device,
  (B) the first control device is configured to write the data in the main cache into the external cache, and
  (C) if the I/O is a read, the I/O request is a read request;
    (c1) the second control device is configured to determine whether read data as target data of the read request exists in the external cache, and
    (c2) if a result of the determination in (c1) is positive, the second control device is configured to read the read data from the external cache; and
wherein the first control device is configured to delete data from the first storage device such that a total data size of the first storage device is smaller than a cache use size that is determined on a basis of a working state of the host computer and is used as the external cache.

2. The computer system according to claim 1, wherein (C) further includes:
(c3) if the result of the determination in (c1) is negative, the second control device is configured to transmit the read request for reading the read data to the storage apparatus.

3. The computer system according to claim 2, wherein:
the number of the host computers is equal to or larger than two, and
(C) further includes:
  (c4) the first control device is configured to receive the read request,
  (c5) the first control device is configured to:
    (c51) determine whether another host computer exists, the another host computer including the external cache that stores the read data and not being a transmission source of the read request, and if the another host computer exists, the read data is read from the external cache of the another host computer.

4. The computer system according to claim 3, wherein in (C5), the first control device is further configured to:
(c52) read the read data from the second storage device, and transmit any one of the read data acquired in (c51) or (c52) to the host computer as the transmission source of the read request, wherein (c52) is performed in parallel with (c51).

5. The computer system according to claim 4, wherein the any one of read data is the read data that has been read earlier.

6. The computer system according to claim 3, if a load on the another host computer, of access to the one or more storage apparatuses is equal to or larger than a predetermined threshold, then the first control device is configured to not perform (c51).

7. The computer system according to claim 2, wherein:
the number of the host computers is equal to or larger than two, and
(c3) includes:
  (c31) if the result of the determination in (c1) is negative, the second control device is configured to determine whether the read data exists in the external cache of another host computer that is different from the host computer including the second control device, (c32) if a result of the determination in (c31) is positive, the second control device is configured to read the read data from the external cache of the another host computer, and (c33) if the result of the determination in (c31) is negative, the second control device is configured to transmit the read request for reading the R read data to the storage apparatus.

8. The computer system according to claim 1, wherein:

the host computer comprises a second storage region configured to store second external cache management information concerning the external cache, and the second storage region exists inside or outside of the second storage device, wherein, in (B), the first control device is configured to transmit cache allocation information to the host computer, the cache allocation information including:

internal address information indicating a data storage destination in the storage apparatus; and external address information indicating a data storage destination in the external cache, and the second control device is configured to:

receive the cache allocation information; and register the cache allocation information into the second external cache management information, and in (c1), the second control device is configured to determine whether the read data exists in the external cache, on a basis of the second external cache management information.

9. The computer system according to claim 1, wherein:

the number of the host computers is equal to or larger than, in (B):

a writing destination of the data associated with the write request is the external cache included in a host computer as a transmission source of the write request, and if the host computer as the transmission source of the write request does not include the external cache, the writing destination of the data associated with the write request is the external cache of another host computer including the external cache.

10. The computer system according to claim 9, wherein in (B), the another host computer is a host computer having a lowest communication load among the plurality of host computers each including the external cache.

11. The computer system according to claim 1, further comprising:

a management system configured to measure a cache use size used as the external cache for a period of time, wherein the management system:

exists inside of at least one of the host computers or the storage apparatuses or outside of the host computers and the storage apparatuses, and displays the cache use size for each period of time in a given period.

12. The computer system according to claim 11, wherein the management system is further configured to:

receive information concerning specifying the cache use size; and determine the cache use size in accordance with the information.

13. The computer system according to claim 1, wherein if a communication load on the host computer including the external cache as a data writing destination is equal to or larger than a predetermined threshold, the first control device is configured to wait for a given length of time before performing (B).

* * * * *